United States Patent
Wu et al.

(10) Patent No.: US 11,815,585 B2
(45) Date of Patent: Nov. 14, 2023

(54) METHOD AND SYSTEM FOR TIME DIVISION MULTIPLEXING MIMO RADAR DOPPLER COMPENSATION USING SPURIOUS ANGLE SPECTRUM HYPOTHESIS TESTS

(71) Applicant: NXP USA, Inc., Austin, TX (US)

(72) Inventors: Ryan Haoyun Wu, San Jose, CA (US); Dongyin Ren, East Brunswick, NJ (US); Satish Ravindran, Santa Clara, CA (US)

(73) Assignee: NXP USA, Inc., Austin, TX (US)

( * ) Notice: Subject to any disclaimer, the term of this patent is extended or adjusted under 35 U.S.C. 154(b) by 333 days.

(21) Appl. No.: 17/187,789

(22) Filed: Feb. 27, 2021

(65) Prior Publication Data

US 2022/0283286 A1 Sep. 8, 2022

(51) Int. Cl.
*G01S 13/58* (2006.01)

(52) U.S. Cl.
CPC .............................. *G01S 13/582* (2013.01)

(58) Field of Classification Search
CPC ........ G01S 13/582; G01S 7/288; G01S 7/292; G01S 13/282; G01S 13/931; G01S 7/03; G01S 13/42; G01S 7/356; G01S 13/343; G01S 7/354; G01S 13/878; G01S 7/0233; G01S 7/0234
See application file for complete search history.

(56) References Cited

U.S. PATENT DOCUMENTS

| | | |
|---|---|---|
| 3,831,174 A | 8/1974 | King et al. |
| 3,935,572 A | 1/1976 | Broniwitz et al. |
| 5,276,453 A | 1/1994 | Heymsfield et al. |
| 5,977,906 A | 11/1999 | Ameen et al. |
| 7,400,290 B2 | 7/2008 | Woodington et al. |

(Continued)

FOREIGN PATENT DOCUMENTS

WO  WO-2021189268  9/2021

OTHER PUBLICATIONS

Non Final Office Action; U.S. Appl. No. 17/186,750; 50 pages (dated Apr. 10, 2023).

(Continued)

*Primary Examiner* — Timothy A Brainard
*Assistant Examiner* — Juliana Cross

(57) ABSTRACT

A method and system are provided to resolve Doppler ambiguity and multiple-input, multiple-output array phase compensation issues present in Time Division Multiplexing MIMO radars by estimating an unambiguous radial velocity measurement. Embodiments apply a disambiguation algorithm that dealiases the Doppler spectrum to resolve the Doppler ambiguity of a range-Doppler detection. Phase compensation is then applied for corrected reconstruction of the MIMO array measurements. The dealiasing processing first forms multiple hypotheses associated with the phase corrections for the radar transmitters based on a measured radial velocity of a range-Doppler cell being processed. A correct hypothesis, from the multiple hypotheses, is selected based on a least-spurious spectrum criterion. Using this approach, embodiments require only single-frame processing and can be applied to two or more transmitters in a TDM MIMO radar system.

16 Claims, 17 Drawing Sheets

(56) References Cited

U.S. PATENT DOCUMENTS

| | | |
|---|---|---|
| 10,205,457 B1 | 2/2019 | Josefsberg et al. |
| 11,402,483 B2 | 8/2022 | Long et al. |
| 2013/0188167 A1 | 7/2013 | Halmos |
| 2016/0131752 A1 | 5/2016 | Jansen et al. |
| 2018/0011170 A1 | 1/2018 | Rao et al. |
| 2019/0242973 A1 | 8/2019 | Schat et al. |
| 2020/0011968 A1 | 1/2020 | Hammes et al. |
| 2020/0025906 A1 | 1/2020 | Kesaraju et al. |
| 2020/0081110 A1 | 3/2020 | Nam et al. |
| 2020/0103515 A1 | 4/2020 | Kishigami et al. |
| 2020/0158861 A1 | 5/2020 | Cattle et al. |
| 2020/0166598 A1 | 5/2020 | Dorn et al. |
| 2020/0233076 A1 | 7/2020 | Chen et al. |
| 2020/0284874 A1 | 9/2020 | Narayana Moorthy et al. |
| 2020/0393553 A1* | 12/2020 | Kishigami ............... G01S 7/036 |
| 2021/0026003 A1 | 1/2021 | Panzer et al. |
| 2021/0156980 A1 | 5/2021 | Stettiner et al. |
| 2021/0156981 A1 | 5/2021 | Stettiner et al. |
| 2021/0156982 A1 | 5/2021 | Stettiner et al. |
| 2021/0229662 A1 | 7/2021 | Ozbilgin |
| 2021/0333386 A1 | 10/2021 | Park et al. |
| 2022/0099795 A1 | 3/2022 | Crouch et al. |
| 2022/0099837 A1 | 3/2022 | Crouch et al. |
| 2022/0283286 A1 | 9/2022 | Wu et al. |
| 2022/0342036 A1 | 10/2022 | Rao et al. |
| 2022/0413132 A1* | 12/2022 | Hasegawa ............ H01Q 1/3208 |

OTHER PUBLICATIONS

Guetlein, Johanna et al., "Motion Compensation for a TDM FMCW MIMO Radar System", Proceedings of the 10th European Radar Conference, Oct. 9, 2013, pp. 37-40, IEEE, Piscataway, NJ, USA.

Roos, Fabian et al., "Enhancement of Doppler Unambiguity for Chirp-Sequence Modulated TDM-MIMO Radars", 2018 IEEE MTT-S International Conference on Microwaves for Intelligent Mobility (ICMIM), Apr. 15, 2018, pp. 1-4, IEEE, Piscataway, NJ, USA.

Schmid, C.M. et al; "Motion Compensation and Efficient Array Design for TDMA FMCW MIMO Radar Systems" 2012 6th European Conference on Antennas and Propagation; pp. 1746-1750 (2012).

Nijsure, Yogesh et al., "Cognitive Chaotic UWB-MIMO Radar Based on Nonparametric Bayesian Technique", IEEE Transactions on Aerospace and Electronic Systems, Jul. 1, 2015, pp. 2360-2378, vol. 51, No. 3, IEEE, Piscataway, NJ, USA.

Shapir, I et al., "Doppler Ambiguity Resolving in TDMA Automotive MIMO Radar via Digital Multiple PRF", 2018 IEEE Radar Conference (Radarconf18), Apr. 23, 2018, pp. 175-180, IEEE, Piscataway, NJ, USA.

Non Final Office Action; U.S. Appl. No. 17/233,952; 38 pages (dated Dec. 7, 2022).

U.S. Appl. No. 17/186750, filed Feb. 26, 2021, and entiled "Radar Communications With Offset Chirp Interval Time".

U.S. Appl. No. 17/233952, filed Apr. 19, 2021, and entiled "Radar Communications With Disparate Pulse Repetition Intervals".

Bechter et al., "Compensation of Motion-Induced Phase Errors in TDM MIMO Radars," IEEE Microwave and Wireless Components Letters, v.27, n. 12 (Dec. 2017), pp. 1164-1166.

Kronague et al., "Radar target detection and Doppler ambiguity resolution," IEEE 11th Int'l Radar Symposium, Vilnius, Lithuania (Jun. 2010), pp. 1-4.

Musa et al., "Ambiguity elimination in HF FMCW radar systems," IEEE Proceedings—Radar, Sonar Navigation, v.147, n.4 (2000), pp. 182-188.

Thurn et al., "Concept and Implementation of a PLL-Controlled Interlaced Chirp Sequence Radar for Optimized Range-Doppler Measurements," IEEE Transactions on Microwave Theory and Techniques, v.64, n.10 (Oct. 2016), pp. 3280-3289.

Final Office Action; U.S. Appl. No. 17/233,952; 28 pages (dated Jun. 6, 2023).

Non Final Office Action; U.S. Appl. No. 17/233,952; 18 pages (dated Sep. 26, 2023).

* cited by examiner

METHOD AND SYSTEM FOR TIME DIVISION MULTIPLEXING MIMO RADAR DOPPLER COMPENSATION USING SPURIOUS ANGLE SPECTRUM HYPOTHESIS TESTS

BACKGROUND

Field

This disclosure relates generally to radar systems and associated methods of operation, and more specifically, to resolving Doppler ambiguity and multiple-input, multiple-output (MIMO) phase compensation issues present in time-division multiplexing MIMO radars.

Related Art

Radar systems are used to detect the range, velocity, and angle of targets. With advances in technology, radar systems can now be applied in many different applications, such as automotive radar safety systems, but not every radar system is suitable for every application. For example, 77 GHz Frequency Modulation Continuous Wave (FMCW) Fast Chirp Modulation (FCM) radars are used with multiple-input, multiple-output (MIMO) arrays as sensors in Advanced Driver Assistance System (ADAS) and autonomous driving (AD) systems.

A Time Division Multiplexed (TDM) linear-chirp waveform is the most common waveform used in mm-Wave FMCW automotive radar systems for constructing a MIMO virtual aperture to achieve higher angular resolution. The TDM approach simplifies MIMO transmission as well as receiving processing, which leads to lower cost and more effective implementations. Time multiplexing of chirps transmitted by different transmitter antennas, however, can result in mismatched phase delays caused by motion of targets. This mismatched phase delay needs to be compensated for with additional processing. But to perform such compensation, radar signal processing needs to estimate unambiguous radial velocity measurements.

BRIEF DESCRIPTION OF THE DRAWINGS

Embodiments of the present invention may be better understood by referencing the accompanying drawings.

The use of the same reference symbols in different drawings indicates identical items unless otherwise noted. The figures are not necessarily drawn to scale.

DETAILED DESCRIPTION

Embodiments of the present invention resolve Doppler ambiguity and multiple-input, multiple-output array phase compensation issues present in Time Division Multiplexing MIMO radars by estimating an unambiguous radial velocity measurement. Embodiments apply a disambiguation algorithm that dealiases the Doppler spectrum to resolve the Doppler ambiguity of a range-Doppler detection. Phase compensation is then applied for corrected reconstruction of the MIMO array measurements. The dealiasing processing first forms multiple hypotheses associated with the phase corrections for the radar transmitters based on a measured radial velocity of a range-Doppler cell being processed. A correct hypothesis, from the multiple hypotheses, is selected based on a least-spurious spectrum criterion. Using this approach, embodiments require only single-frame processing and can be applied to two or more transmitters in a TDM MIMO radar system.

In the context of the present disclosure, it will be appreciated that radar systems may be used as sensors in a variety of different applications, including but not limited to automotive radar sensors for road safety systems, such as advanced driver-assistance systems (ADAS) and autonomous driving (AD) systems. In such applications, the radar systems are used to measure radial distance to a reflecting object, its relative radial velocity, and angle information, and are characterized by performance criteria, such as the angular resolution (e.g., a minimum distance between two equally large targets at the same range and range rate, or radial velocity, cell at which a radar is able to distinguish and separate the targets), sensitivity, false detection rate, and the like. Typically, frequency modulated continuous wave (FMCW) modulation radars are used to identify the distance, velocity, and/or angle of a radar target, such as a car or pedestrian, by transmitting Linear Frequency Modulation (LFM) waveforms from multiple transmit antennas so that reflected signals from the radar target are received at multiple receive antennas and processed to determine the radial distance, relative radial velocity, and angle (or direction) for the radar target. However, with current automotive designs, a vehicle can include multiple radar transmitters that operate independently from one another. As a result, the LFM waveform transceivers may be configured to implement time-division (TD) MIMO operations to temporally separate signals originated from distinct transmitters so that a receiving channel can distinctly detect each signal and thereby construct a virtual MIMO array.

Figure 1:
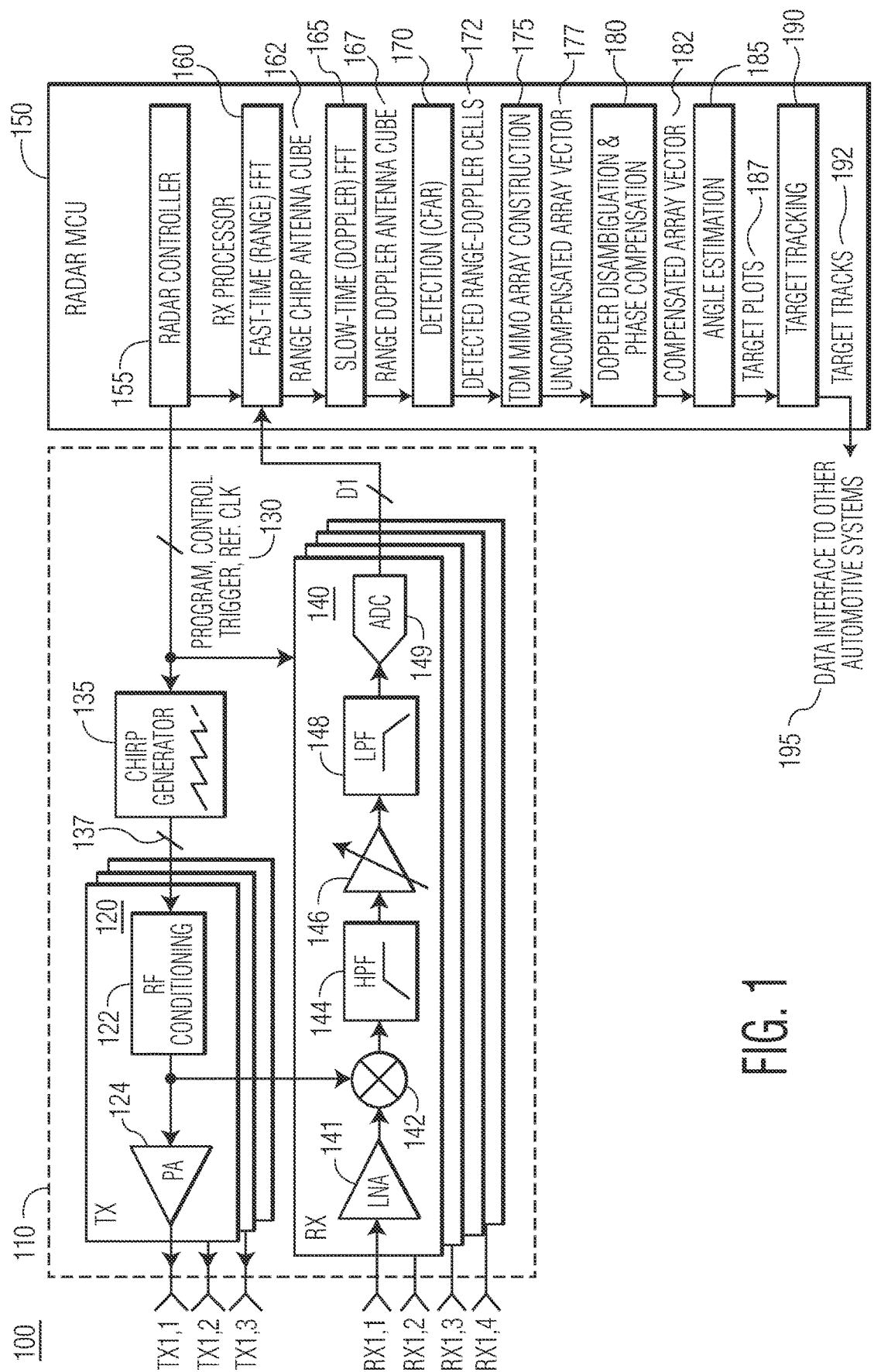
FIG. 1 which depicts a simplified schematic block diagram of a conventional LFM TD-MIMO automotive radar system that includes an LFM TD-MIMO radar device connected to a radar microcontroller and processing unit.

To illustrate the design and operation of a conventional TD MIMO radar system, reference is now made to FIG. 1 which depicts a simplified schematic block diagram of a conventional LFM TD-MIMO automotive radar system 100 which includes an LFM TD-MIMO radar device 110 connected to a radar microcontroller and processing unit ("radar MCPU") 150. In selected embodiments, the LFM TD-MIMO radar device 110 may be embodied as a line-replaceable unit (LRU) or modular component that is designed to be replaced quickly at an operating location. Similarly, the radar microcontroller and processing unit 150 may be embodied as a line-replaceable unit (LRU) or modular component. Although a single or mono-static LFM TD-MIMO radar device 110 is shown, it will be appreciated that additional distributed radar devices may be used to form a distributed or multi-static radar. In addition, the depicted radar system 100 may be implemented in integrated circuit form with the LFM TD-MIMO radar device 10 and the radar microcontroller and processing unit 150 formed with separate integrated circuits (chips) or with a single chip, depending on the application.

Each radar device 110 includes one or more transmitting antenna elements $TX_i$ and receiving antenna elements $RX_j$ connected, respectively, to one or more radio-frequency (RF) transmitter (TX) units 120 and receiver (RX) units 140. For example, each radar device (e.g., 110) is shown as including individual antenna elements (e.g., $TX_{1,i}$, $RX_{1,j}$) connected, respectively, to three transmitter modules (e.g., 120) and four receiver modules (e.g., 140), but these numbers are not limiting, and other numbers are also possible, such as four transmitter modules 120 and six receiver modules 140, or a single transmitter module 120 and/or a single receiver module 140. Each radar device 110 also includes a chirp generator 135 which is configured and connected to supply a chirp input signal to the transmitter modules 120. To this end, the chirp generator 135 is connected to receive a separate and independent local oscillator (LO) signal and a chirp start trigger signal (illustrated as 130), though delays are likely to be different due to the signal path differences and programmable digital delay elements in the signal paths. Chirp signals 137 are generated and transmitted to multiple transmitters 120, usually following a pre-defined transmission schedule, where they are filtered at the RF conditioning module 122 and amplified at the power amplifier 124 before being fed to the corresponding transmit antenna $TX_{1,i}$ and radiated. By sequentially using each transmit antenna $TX_{1,i}$ to transmit successive pulses in the chirp signal 137, each transmitter element 120 operates in a time-multiplexed fashion in relation to other transmitter elements because they are programmed to transmit identical waveforms on a temporally separated schedule.

The radar signal transmitted by the transmitter antenna unit $TX_{1,i}$, $TX_{2,i}$ may be reflected by an object, and part of the reflected radar signal reaches the receiver antenna units $RX_{1,j}$ at the radar device 110. At each receiver module 140, the received (radio frequency) antenna signal is amplified by a low noise amplifier (LNA) 141 and then fed to a mixer 142 where it is mixed with the transmitted chirp signal generated by the RF conditioning unit 122. The resulting intermediate frequency signal is fed to a first high-pass filter (HPF) 144. The resulting filtered signal is fed to a first variable gain amplifier 146 which amplifies the signal before feeding it to a first low pass filter (LPF) 148. This re-filtered signal is fed to an analog/digital converter (ADC) 149 and is output by each receiver module 140 as a digital signal D1. The receiver module compresses target echo of various delays into multiple sinusoidal tones whose frequencies correspond to the round-trip delay of the echo.

The radar system 100 also includes a radar microcontroller and processing unit 150 that is connected to supply input control signals to the radar device 110 and to receive therefrom digital output signals generated by the receiver modules 140. In selected embodiments, the radar microcontroller and processing unit 150 may be embodied as a micro-controller unit (MCU) or other processing unit that is configured and arranged for signal processing tasks such as, but not limited to, target identification, computation of target distance, target velocity, and target direction, and generating control signals. Radar controller 155 can, for example, be configured to generate calibration signals, receive data signals, receive sensor signals, generate frequency spectrum shaping signals (such as ramp generation in the case of FMCW radar) and/or register programming or state machine signals for RF (radio frequency) circuit enablement sequences. In addition, the radar controller processor 155 may be configured to program the modules 120 to operate in a time-division fashion by sequentially transmitting LFM chirps for coordinated communication between the transmit antennas $TX_{1,i}$, $RX_{1,j}$.

The result of the digital processing at the radar microcontroller and processing unit 150 is that the digital domain signals D1 are processed for the subsequent fast-time range fast-Fourier transform (FFT) (160), which generates a range chirp antenna cube matrix 162. Range chirp antenna cube 162 is provided to a slow-time Doppler FFT processing (165) to generate a range Doppler antenna cube matrix 167. The range Doppler antenna cube is provided to a constant false alarm rate (CFAR) target detection processing (170) that generates a set of detected range-Doppler cells 172. TD MIMO Array Construction processing (175) generates an uncompensated array vector 177, which contains errors in phase delays from moving targets. Doppler disambiguation and phase compensation (180) is then performed to provide a phase compensated array vector 182. Spatial angle estimation (185) and target tracking processing (190) can then be performed, generated target plots 187 and target tracks 192, respectively. The result is then output to other automotive computing or user interfacing devices (195) for further process or display.

Figure 2:
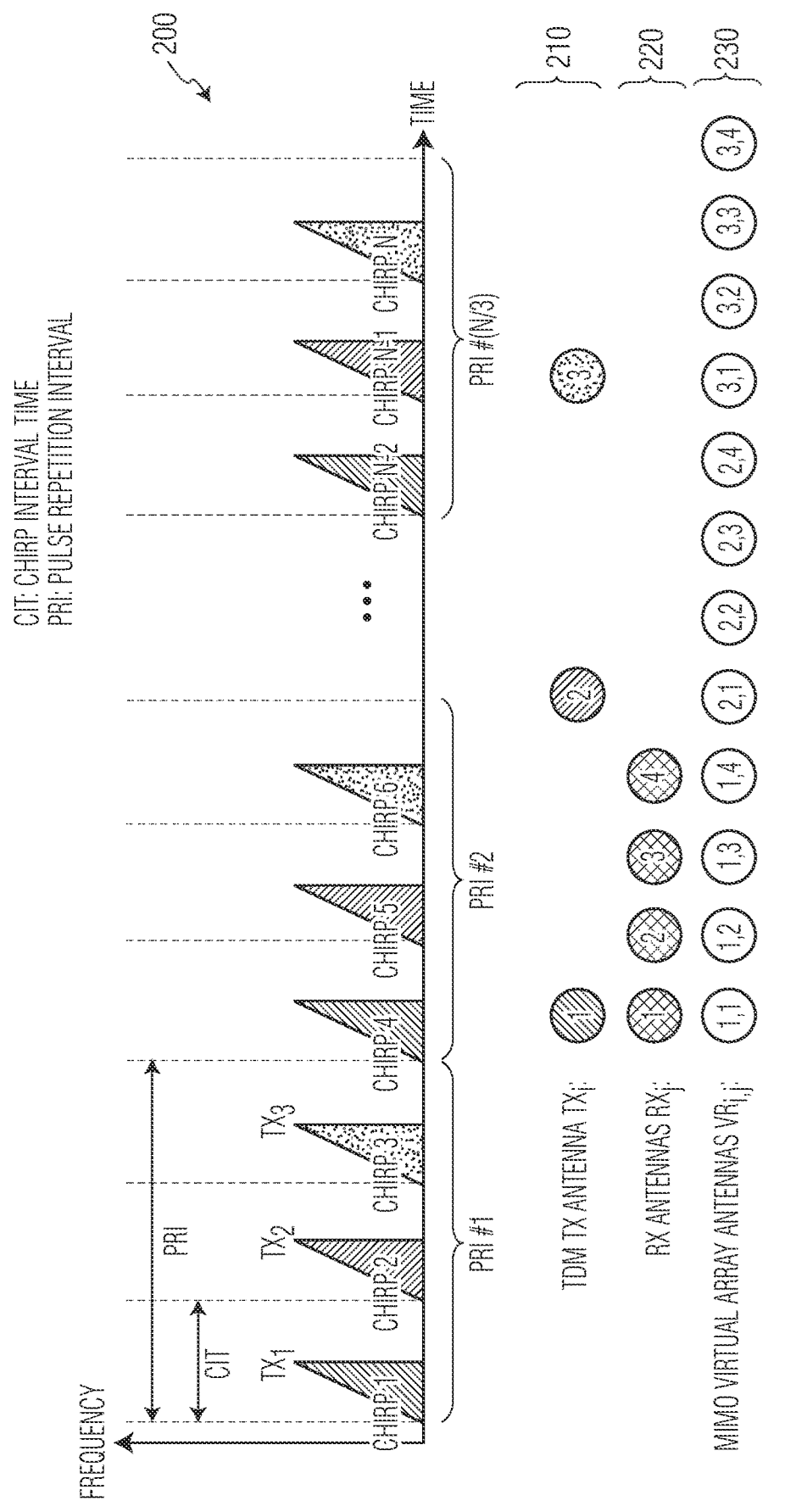
FIG. 2 is a simplified block diagram depicting an example of a chirp transmission schedule of a three-transmitter TDM MIMO radar system.

FIG. 2 is a simplified block diagram depicting an example of a chirp transmission schedule 200 of a 3-TX TDM MIMO radar system. Three transmission antennae $TX_i$: $TX_1$, $TX_2$, and $TX_3$ (210), are sequentially alternated to transmit radar chirps (Chirp 1-Chirp N). A chirp interval time (CIT) separates the beginning of each successive chirp, while a pulse repetition interval (PRI) designates the time for a cycle of all the transmitters. The reflections of the transmitted chirps from targets within the range of the radar are received by a set of receivers $RX_j$: $RX_1$, $RX_2$, $RX_3$, $RX_4$ (220). Range-Doppler response maps of the four illustrated receivers from the three illustrated transmission CIT periods are aggregated to form a MIMO array measurement data cube (e.g., range chirp antenna cube 162) consisting of range-Doppler response maps of 12 antenna elements of a constructed MIMO virtual array (230).

Typically, range-Doppler responses are then non-coherently integrated and target detection is attempted on the energy-combined range-Doppler map. A detection algorithm, such as any variant of the CFAR algorithm (e.g., 170), is commonly used to identify those range-Doppler cells in which targets may be present (e.g., detected range-Doppler cells 172). For each cell in which a target is detected, an array measurement vector is extracted (e.g., uncompensated array vector 177) and processed to determine the incident angles of the target returns contained in the cell.

This process is complicated by the TDM MIMO operation in which MIMO transmitters are transmitting at different times. Further, there can be relative motion between the radar and the targets.

Figure 3:
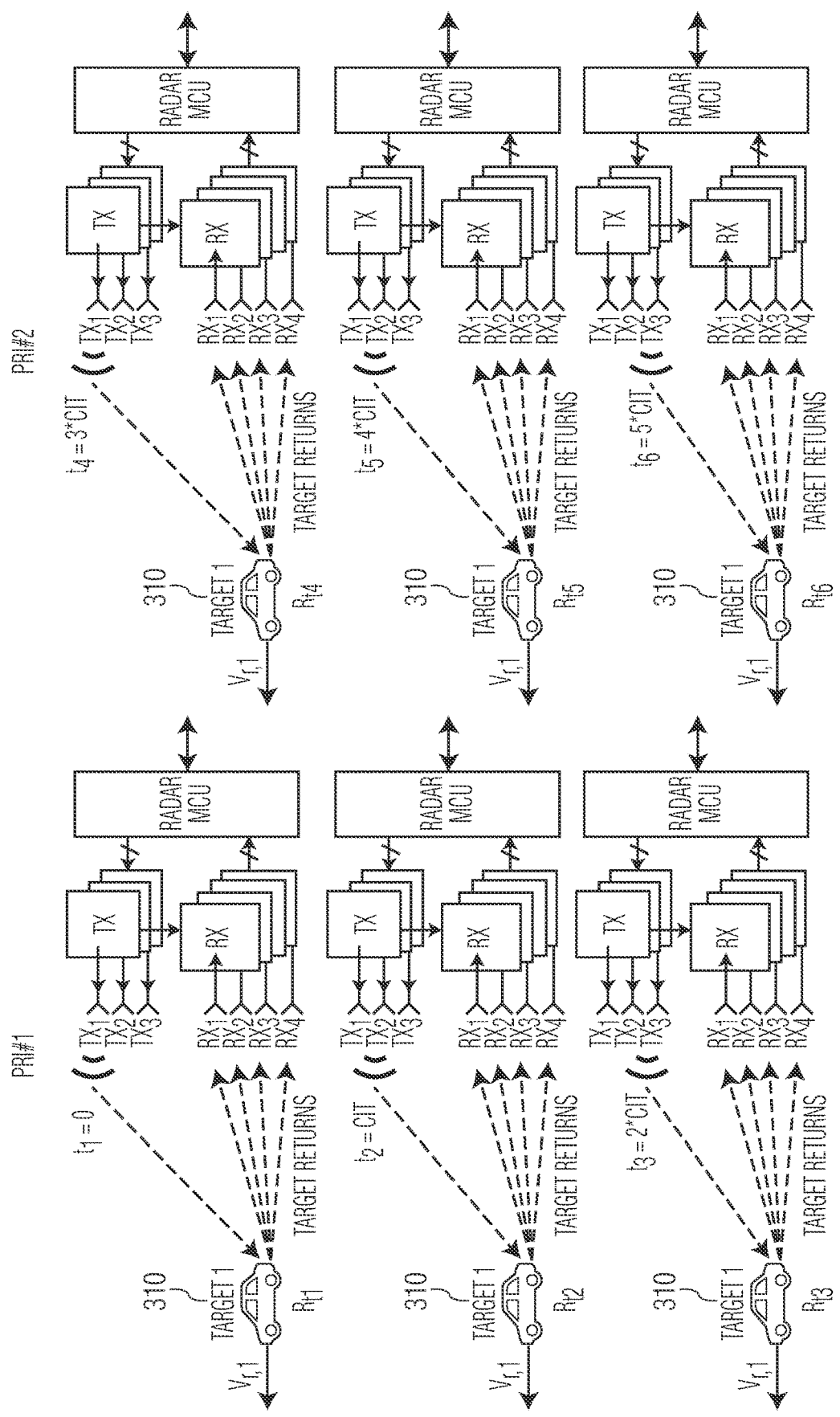
FIG. 3 is a simplified block diagram illustrating an interaction between the radar and a moving target within two consecutive PRIs.

FIG. 3 is a simplified block diagram illustrating an interaction between the radar and a moving target within 2 consecutive PRIs: PRI #1 and PRI #2. Each PRI consists of three chirp transmission periods corresponding to each of three transmitters (e.g., $t_1$, $t_2$, and $t_3$ for PRI #1 and $t_4$, $t_5$, and $t_6$ for PRI #2). Between any two transmitting periods, movement of target 310 results in a change in the distance to the radar's phase center (e.g., $D_n=D_0+t_n*V_{r,1}$). This change in distance translates to a change in the round-trip phase delay of the reflected return signals. The round-trip phase delay causes phase offsets across subsequent transmission periods. These phase offsets must be compensated for to generate the equivalent of simultaneous transmission and perfect separation of transmitter signals of an "ideal" MIMO radar system in which distance-change induced phase offsets do not exist. This is performed during Doppler disambiguation and phase compensation processing 180 of FIG. 1.

As illustrated in FIG. 2, the MIMO virtual array antennas 230 can be designated as a two-dimensional matrix $VR_{i,j}$. Using this convention, a TDM MIMO virtual array spatial measurement vector is designated $\bar{x}$, where $\bar{x}=[x_{1,1}, x_{1,2}, x_{1,3}, x_{1,4}, x_{2,1}, x_{2,2}, x_{2,3}, x_{2,4}, x_{3,1}, x_{3,2}, x_{3,3}, x_{3,4}]$. An element $x_{i,j}$ is the output of $RX_j$ when $TX_i$ is transmitting. For a target with a radial velocity $V_{r0}$, TDM-induced phase errors corresponding to the virtual array spatial measurement vector elements are $[A_1, A_1, A_1, A_1, A_2, A_2, A_2, A_2, A_3, A_3, A_3, A_3]$, where $$A_i = \frac{4\pi}{\lambda} * V_{r0} * CIT * (i-1) [\text{in radians}]$$

where CIT is the Chirp Interval Time, and $\lambda$ is the wavelength of the chirp signal.

As seen in $A_i$, unwanted phase offsets can be compensated when the radial velocity of the target and the time between the transmissions are known. Assuming each detection cell has only one target present, an estimated radial velocity of the target is readily available from the cell's corresponding Doppler frequency. Phase offset is then calculated based on the twice the distance travelled by the target between the two transmission events. An amount of phase offset for an i-th transmitter ($A_i$) can be estimated using the following equation, where $\hat{V}_r$ is the estimated radial velocity of the target:

$$\hat{A}_i = \frac{4\pi}{\lambda} * \hat{V}_r * CIT * (i-1) [\text{Rad}]$$

But if the estimated radial velocity is erroneous, then there will be a phase discontinuity in the constructed MIMO array measurement vector. Causes of such error can include, for example:

1. When a target's radial velocity exceeds the maximum unambiguous radial speed measurable by the system. This causes integer-$2\pi$ ambiguity in estimated Doppler shifts or radial velocities. Ambiguity occurs when the condition below is true, where N is the number of TDM transmitters and PRI is the Pulse Repetition Interval and PRI=CIT*N.

$$|V_r| > V_{r,max} \equiv \frac{\lambda}{4*PRI} = \frac{\lambda}{4*CIT*N}$$

Note that a Doppler spectrum spans an unambiguous radial velocity detection range from $-V_{r,max}$ to $+V_{r,max}$. As will be discussed in greater detail below, any radial velocity outside the unambiguous range will be aliased onto the $-\pi$ to $+\pi$ spectrum (or, equivalently, the 0 to $+2\pi$ Doppler spectrum corresponding to 0 to $2V_{r,max}$ radial velocity).

2. When there are multiple targets in a single detection cell. Targets within the same resolution cell have similar modulo-$2V_{r,max}$ radial velocities but actual velocities may differ significantly. So, a phase compensation derived from a single $\hat{V}_r$ value may fail to correctly compensate the phase from all targets.
3. When there is a quantization error of the Doppler estimates. Then actual radial velocity likely differs from the radial velocity corresponding to center of the Doppler cell.
4. When there is a low signal-to-noise ratio (SNR). The Doppler spectrum contains larger estimation error when SNR is lower.

Figure 4:
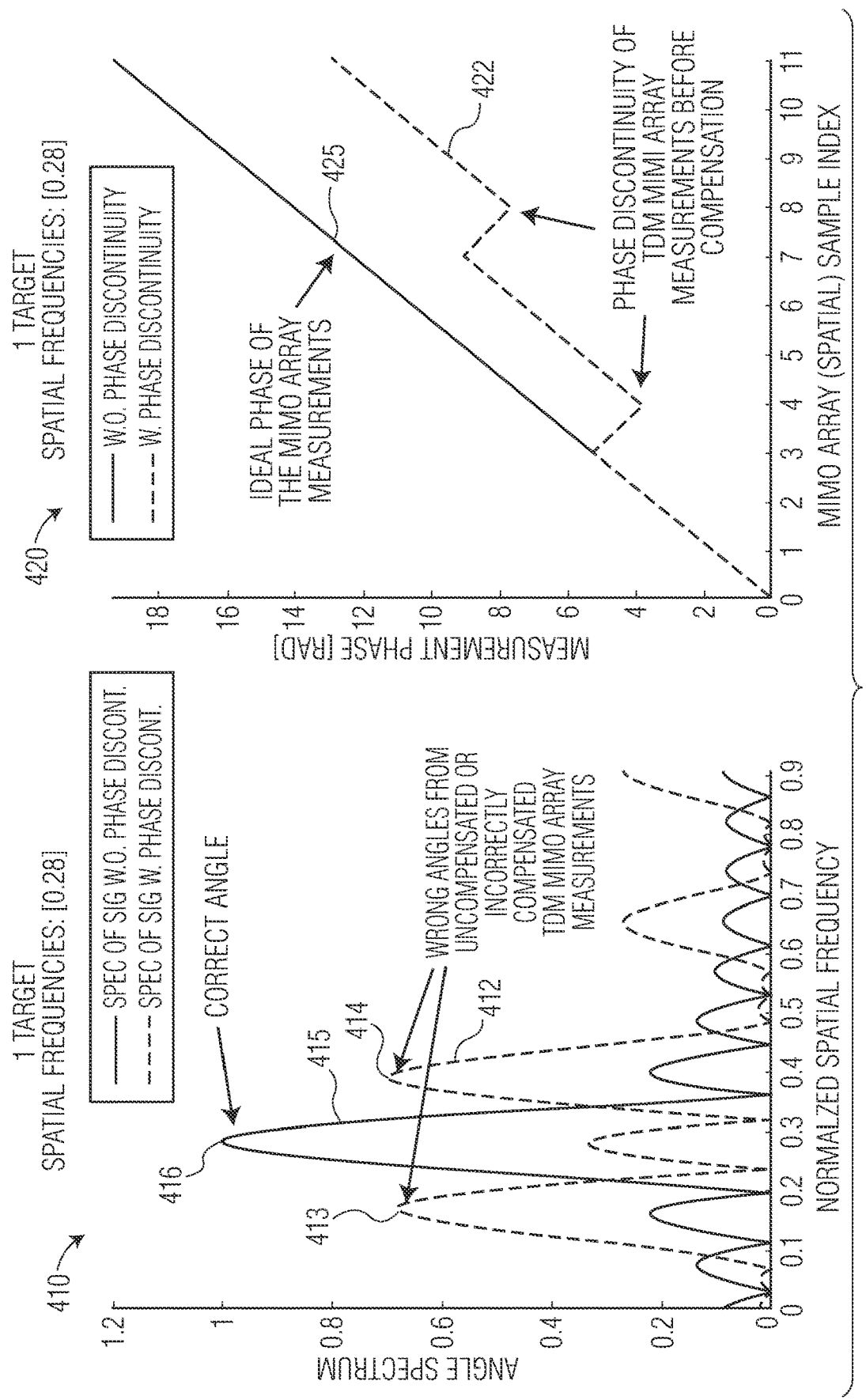
FIG. 4 illustrates an example of a 12-element MIMO virtual array measurement vector with one target present in a range-Doppler cell.
Figure 5:
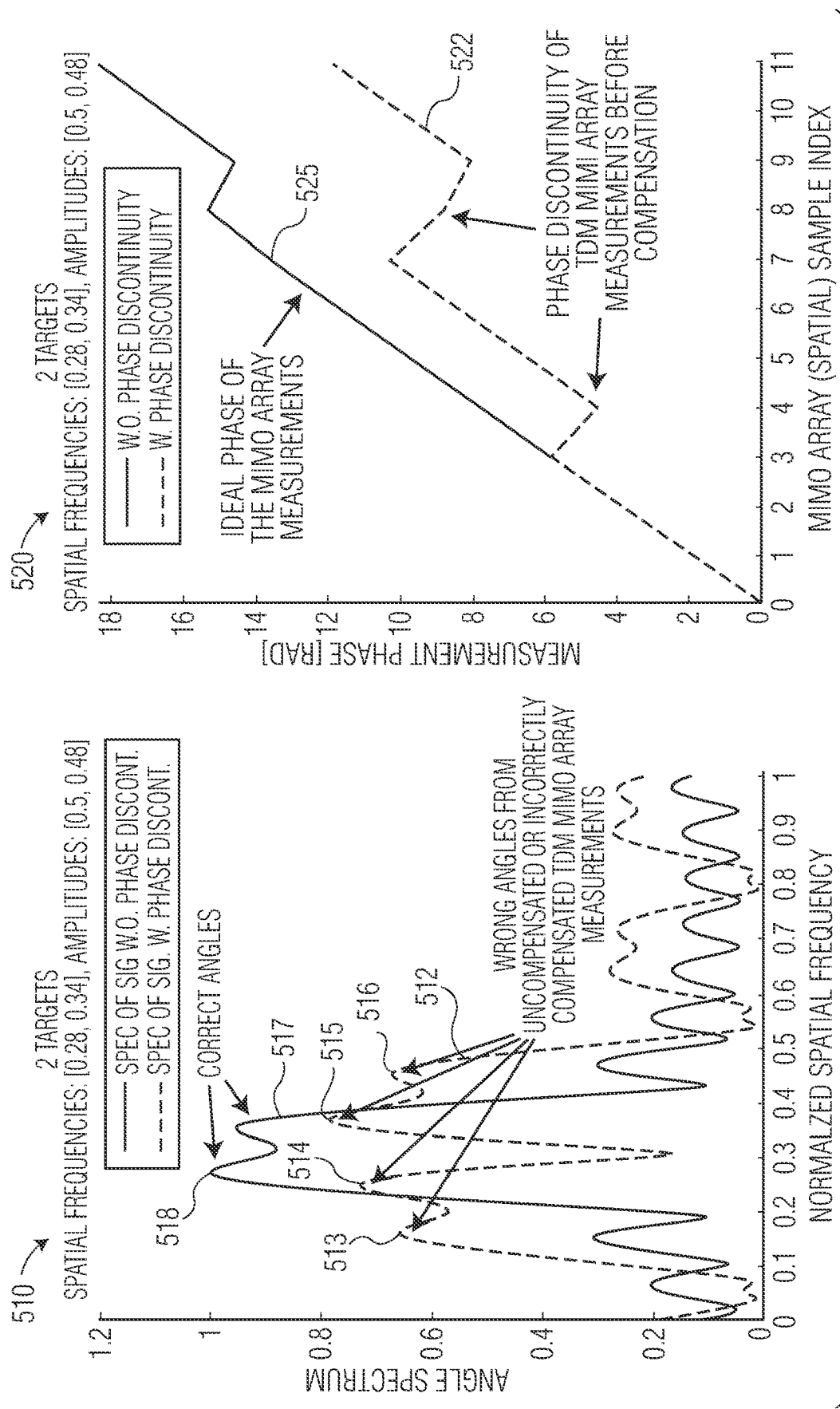
FIG. 5 illustrates an example of a 12-element MIMO virtual array measurement vector with two targets present in a range-Doppler cell.

FIGS. 4 and 5 are angle spectrum charts illustrating examples of erroneous angle spectrums from uncompensated TDM MIMO array measurement vectors. If the data is left uncompensated, then the estimated target angles would likely be corrupted.

FIG. 4 illustrates an example of a 12-element MIMO virtual array measurement vector with one target present in a range-Doppler cell. Due to target motion and incorrectly compensated phase error (or not compensated for phase error), a phase discontinuity is present in the MIMO array measurement vector 422 in plot 420 and the resulting angle spectrum is distorted (curve 412 on plot 410). Curves 415 and 425 indicate the cases of correctly compensated measurement vector in plot 420 and angle spectrum in plot 410. The incorrectly compensated angle spectrum 412 results in two incorrect peaks 413 and 414, while the correctly compensated spectrum has a peak 416 corresponding to the correct spatial frequency.

FIG. 5 illustrates an example of a 12-element MIMO virtual array measurement vector with two targets present in a range-Doppler cell. Due to target motion and incorrectly compensated phase error (or not compensated for phase error), a phase discontinuity is present in the MIMO array measurement vector 522 in plot 520 and the resulting angle spectrum is distorted (curve 512 on plot 510). Curves 517 and 525 indicate the cases of correctly compensated measurement vector in plot 520 and angle spectrum in plot 510. The incorrectly compensated angle spectrum 512 results in a set of incorrect peaks 513-516, while the correctly compensated spectrum has peaks 518 and 519 corresponding to the correct spatial frequency.

It should be noted that the correctly compensated angle spectrums (e.g., curves 415 and 517) may or may not have higher peak response than the uncompensated spectrums (e.g., curves 412 and 512). Thus, a strongest-peak criterion cannot be reliably used as an indicator for absence of phase discontinuity in a constructed MIMO array measurement vector. A different solution that correctly estimates radial velocity in the presence of Doppler ambiguity is needed.

Embodiments provide a disambiguation algorithm to de-alias Doppler spectrum and resolve Doppler ambiguity of a range-Doppler detection. Phase compensation is then applied to correctly reconstruct MIMO array measurements. Dealiasing first forms multiple hypotheses regarding phase corrections for the transmitters based on the measured radial velocity of a detected range-Doppler cell being processed. Selection of the correct hypothesis is performed based on a least-spurious spectrum criterion, as will be illustrated below. This approach is scalable to two or more transmitters in a TDM MIMO radar system, unlike certain prior art systems.

In the following description of an embodiment of the present invention, a three-transmitter radar system, such as that illustrated in FIG. 2, will be discussed. It should be understood that embodiments are not limited to a three-transmitter radar system, and a generalized system will be illustrated further below.

Figure 11:
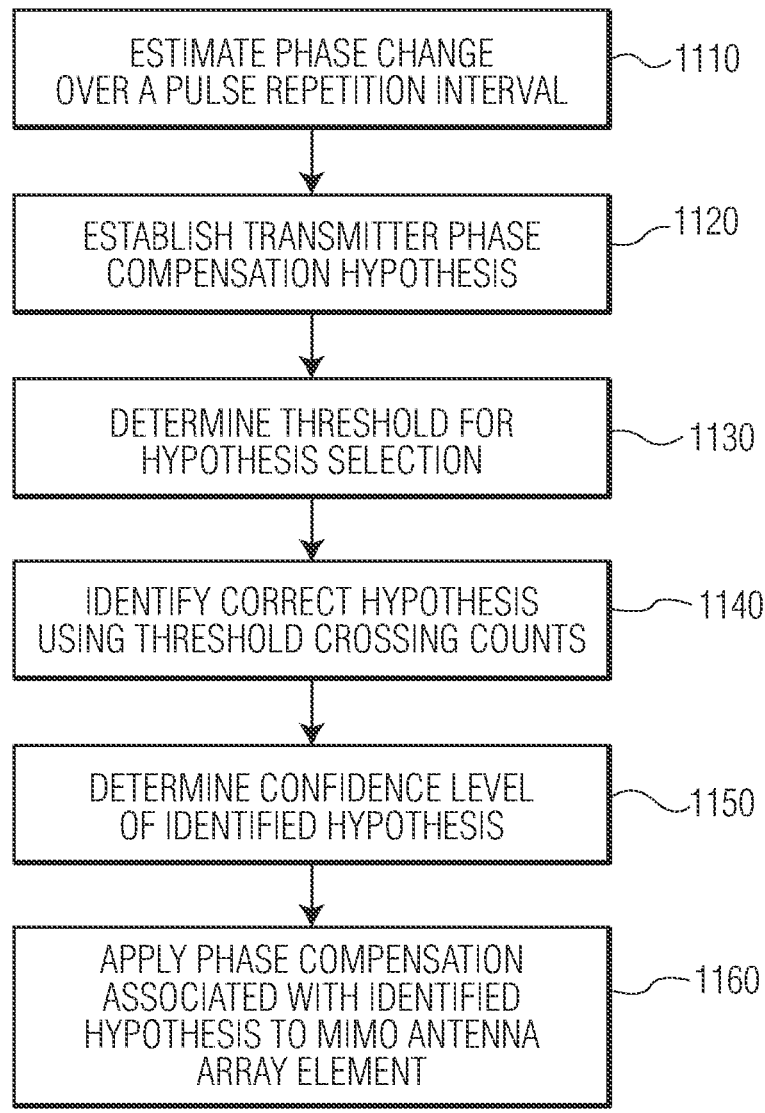
FIG. 11 is a simplified flow diagram illustrating an example of a process used to determine a phase compensation associated with a TDM MIMO array element in accordance with an embodiment of the present invention.

FIG. 11 is a simplified flow diagram illustrating an example of a process used to determine a phase compensation associated with a TDM MIMO array element in accordance with an embodiment of the present invention. This process can be executed as part of Doppler disambiguation and phase compensation processing (180) executed by the receiver processor of Radar MCPU 150.

Using a three-transmitter TDM MIMO system, the following hypotheses can be constructed for possible phase compensation values. With three transmitters running in a TDM chirp sequence, such as that illustrated in FIG. 2, for a detection cell, a first step performed by a Doppler disambiguation and phase compensation process (e.g., 180), is to estimate a phase change between Chirp 1 and Chirp 4, or the PRI, denoted as A (1110).

If there is only one target present, and the true phase change is A degrees, which results from an actual radial velocity $V_{r0}$, then A relates to $V_{r0}$ by the following:

$$A = 360 * 2 * V_{r0} * PRI \text{ [deg]} = 360 * 2 * V_{r0} * (3*CIT)/\lambda \text{ [deg]}$$

In practice, however, A, is unknown, but a measurement of A can be obtained from the detected Doppler cell. This measurement is the estimated phase change, $\hat{A}$, which can be directly obtained using the radial velocity of the Doppler detection cell $\hat{V}_r$ by the following:

$$\hat{A} = 360 * 2 * \hat{V}_r * PRI \text{ [deg]} = 360 * 2 * \hat{V}_r * (3*CIT)/\lambda \text{ [deg]}$$

Once $\hat{A}$ is determined, a next step executed by Radar MCPU 150 is to establish the set of transmitter phase compensation hypotheses (1120). For the three-transmitter radar example, the following process is used to establish the hypotheses. Given that CIT is a constant across all chirps, the phase change occurring in the $2^{nd}$ and the $3^{rd}$ can then be linearly interpolated based on the following rule (for the i-th chirp of an $N_{TX}$ TDM system where i=1, 2 ... $N_{TX}$):

$$A_i = A * (i-1)/N_{TX}$$

Where $A_i$ is the phase change corresponding to the beginning of the i-th CIT. Thus, for a three-transmitter radar, i=1, 2, 3:
i=1→The phase change corresponding to the beginning of the $1^{st}$ CIT, $A_1$=0.
i=2→The phase change corresponding to the beginning of the $2^{nd}$ CIT, $A_2$=A*1/3.
i=3→The phase change corresponding to the beginning of the $3^{rd}$ CIT, $A_3$=A*2/3.

In practice, however, A is unknown, and therefore a measurement of $\hat{A}$ is used. This introduces additional errors that need correction. These errors are corrected to establish the correct hypothesis.

As an example, for the three-transmitter scenario above, if A=375°, then $A_2$=A/3=125° and $A_3$=A*2/3=250°. These represent the phase angles to be compensated. In practice, though, phase is measured in modulo 2π, therefore the actual measurements will be: $\hat{A}$=mod(A, 360°)=15°, with $\hat{A}_2$=$\hat{A}$/3=5° and $\hat{A}_3$=$\hat{A}$*2/3=10°. These are incorrect estimates that can result in erroneous phase compensation, causing phase discontinuity in the MIMO array vector. In light of the above, the compensation error is −120° and −240°, respectively.

In another example for the three-transmitter scenario, if A=735°, then $A_2$=A/3=245° and $A_3$=A*2/3=490°. Given that phase is measured in modulo 2π, the actual measurements will be $\hat{A}$=mod(A, 360°)=15°, such that $\hat{A}_2$=$\hat{A}$/3=5° and $\hat{A}_3$=$\hat{A}$*2/3=10°, which are incorrect estimates resulting in erroneous phase compensation that causes phase discontinuity in the MIMO array vector. In this case, the compensation error is −240° and −120°, respectively.

As another example for the three-transmitter scenario, if A=1095°, then $A_2$=A/3=365° (or 5° after modulo 360°) and $A_3$=A*2/3=730° (or 10° after modulo 360°). The actual measurements, since phase is measured in modulo 2π, will be: $\hat{A}$=mod(A, 360°)=15°, such that $\hat{A}_2$=$\hat{A}$/3=5° and $\hat{A}_3$=$\hat{A}$*2/3=10°, which are correct estimates such that the compensation error is 0 degrees and 0 degrees, respectively.

In light of the above, for the three-transmitter TDM scenario, the following three hypotheses are established:
H0: If ambiguity of $\hat{A}$ is ±(0π+multiples of 6π [radians]), including 0π, the Phase Compensation Error Correction of TX2 and TX3 measurements should be [0°, 0°], respectively.
H1: If ambiguity of $\hat{A}$ is ±(2π+multiples of 6π [radians]), including 2π, the Phase Compensation Error Correction of TX2 and TX3 measurements should be [120°, 240°], respectively.
H2: If ambiguity of $\hat{A}$ is ±(4π+multiples of 6π [radians]), including 4π, the Phase Compensation Error Correction of TX2 and TX3 measurements should be [240°, 120°/480°], respectively.

In light of these hypotheses, depending upon the conditions for which hypothesis are true, the final phase compensation values should be consistent with these rules:
If H0 is true→Phase Compensations to measurements originating from [TX1, TX2, TX3], should be:

$$[A_1, A_2, A_3] = \left[0, -\frac{\hat{A}}{3}, -\frac{2\hat{A}}{3}\right]$$

If H1 is true→Phase Compensations to measurements originating from [TX1, TX2, TX3], should be:

$$[A_1, A_2, A_3] = \left[0, -\left(\frac{\hat{A}}{3}+\frac{2\pi}{3}\right), -\left(\frac{2\hat{A}}{3}+\frac{4\pi}{3}\right)\right]$$

If H2 is true→Phase Compensations to measurements originating from [TX1, TX2, TX3], should be:

$$[A_1, A_2, A_3] = \left[0, -\left(\frac{\hat{A}}{3}+\frac{4\pi}{3}\right), -\left(\frac{2\hat{A}}{3}+\frac{8\pi}{3}\right)\right]$$

The hypotheses are fixed with respect to each Doppler cell, so once a hypothesis is established for the first time, that hypothesis can be stored and reused until the TDM transmitter number or scheduled sequence is changed. In addition, the correct phase compensation cannot be found unless a correct hypothesis is also found. Therefore, a next step of the phase compensation solution process is identifying the correct hypothesis to obtain a corresponding angle response by testing each hypothesis (1140).

The correct hypothesis can be identified based on the spurious level of its angle spectrum, which is defined as a number of spectral points above a predefined threshold. The correct hypothesis should lead to the least spurious angle spectrum (i.e. the spectrum that has the fewest points above the threshold, as compared to the other spectra). In other words, find the m such that the m-th hypothesis threshold crossing counts, $C_m$, is minimized based on the following equation:

$$C_m = \text{numel}(|Y_m| > TH)$$

In this equation, $|Y_m|$ is the magnitude of the angle spectrum of an m-th hypothesis, TH is the threshold, and numel(Γ) is an operation that counts a number of elements of the test vector F being true. This rule was arrived at through observation that phase discontinuity in the array vector leads to spurious angle spectrum response and widened spectral width. In light of this observation, the correct hypothesis should lead to the sparsest angle spectrum estimate, leading to the fewest spectral points above the threshold. In practice, the spectral estimation sidelobe should be suppressed by applying tapering or windowing to the MIMO array vector to improve the robustness of the hypothesis test.

The threshold, TH, is set between a minimum target and the demonstrated noise (1130). That is, the threshold is set lower than the lowest peak in the spectrum and higher than the noise floor. The determination of the threshold is performed prior to identifying the correct hypothesis (1140).

Another advantage of embodiments of the present invention is that beside being applicable to a conventional uniform linear array (ULA), the rule is applicable to a sparse array as well (i.e., a ULA with few holes). However, a higher sidelobe level produced by a sparse array can adversely affect detection of the correct hypothesis, which requires the fewest spectral points above threshold. To handle this issue without increasing computing complexity, the threshold, TH, should be elevated according to the increased sparsity, since the $C_m$ of correct hypothesis, which correspond to the ideal MIMO sparse array that has more uniform sidelobe level, will drop much faster than the wrong hypotheses. Thus, the fewest spectral points spectrum will translate to the correct hypothesis when an appropriate threshold is selected.

Figure 6A:
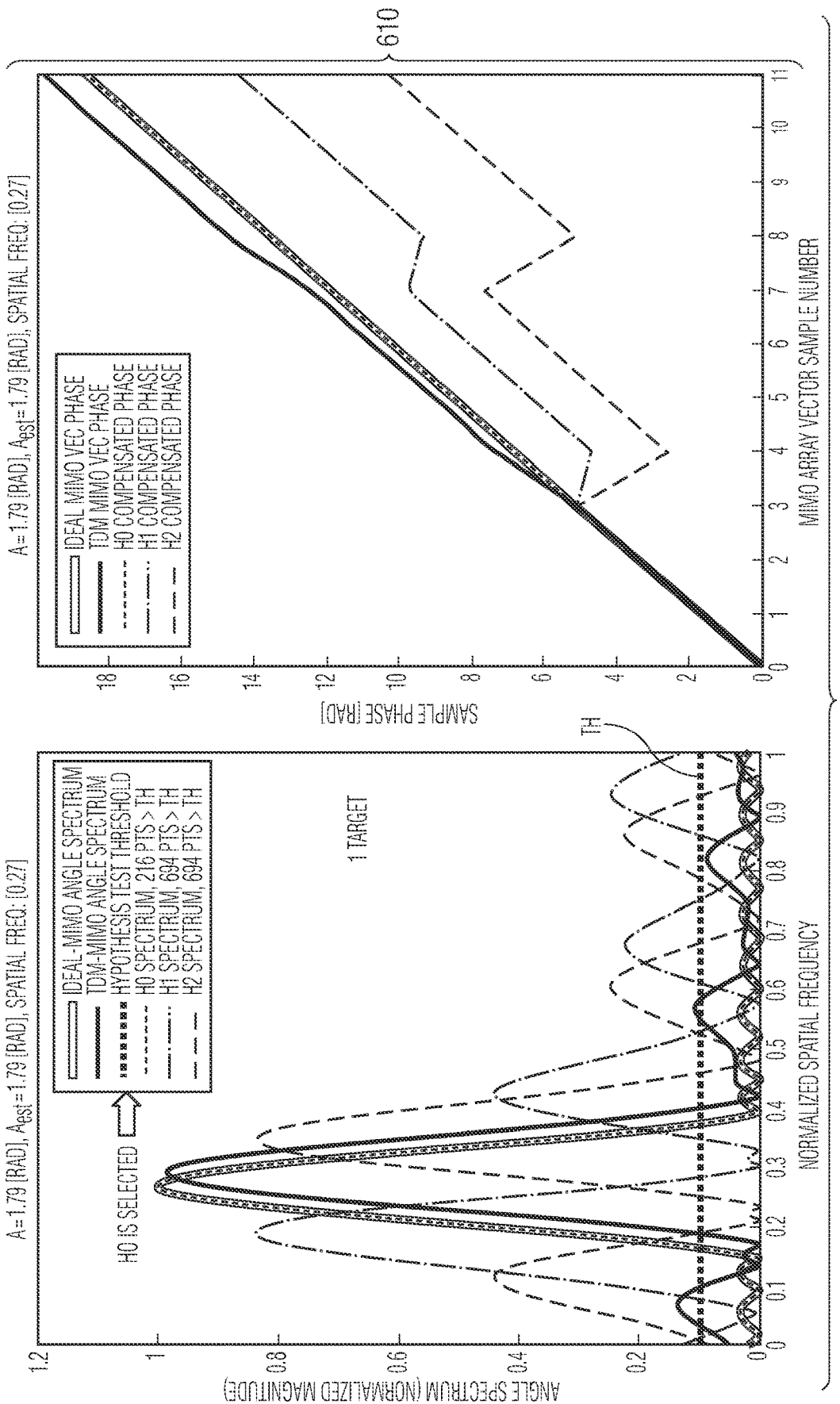
FIGS. 6A, 6B, 7A, 7B, 8A, and 8B are spectral diagrams illustrating examples of hypothesis tests for different levels of ambiguity in A.
Figure 6B:
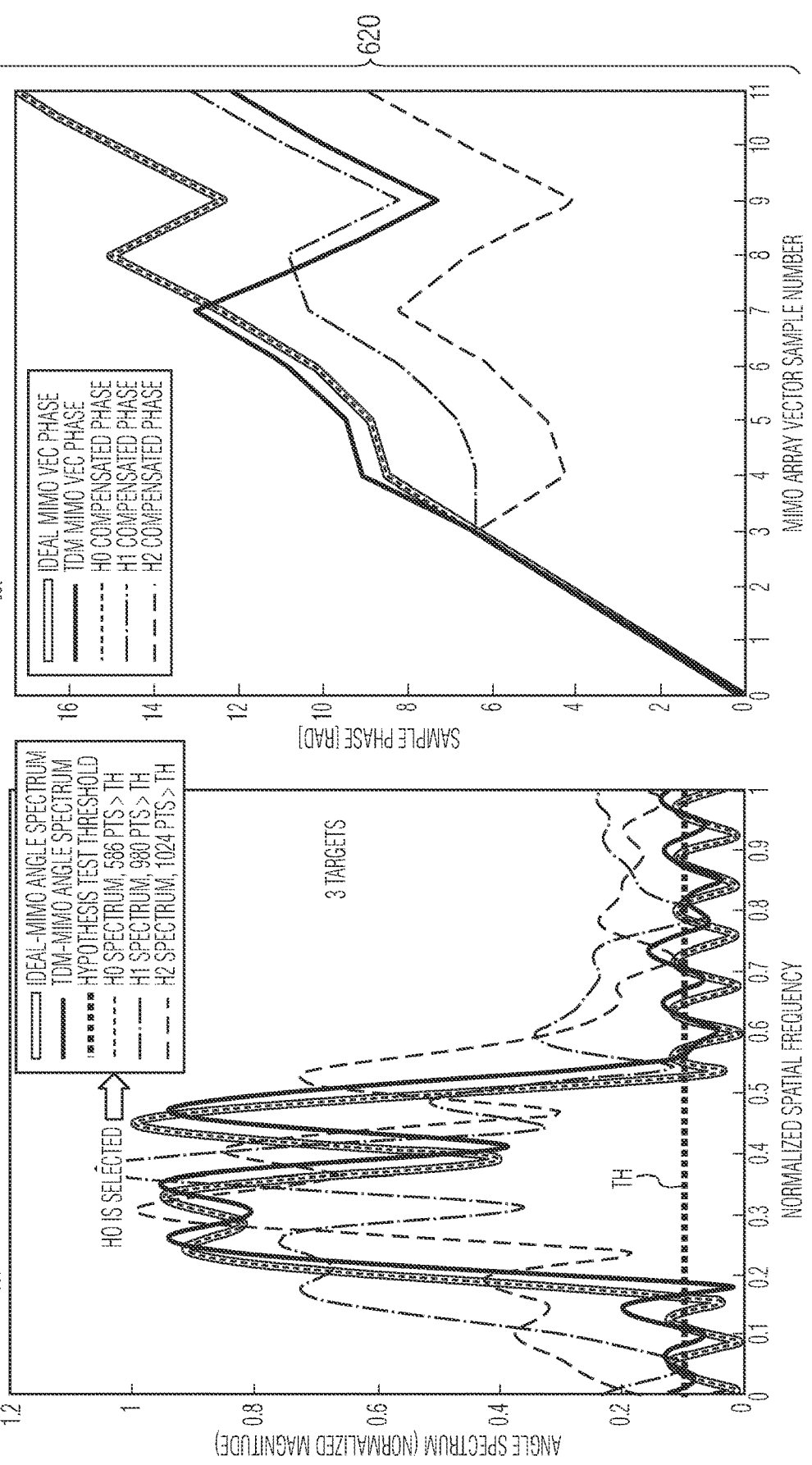
Figure 7A:
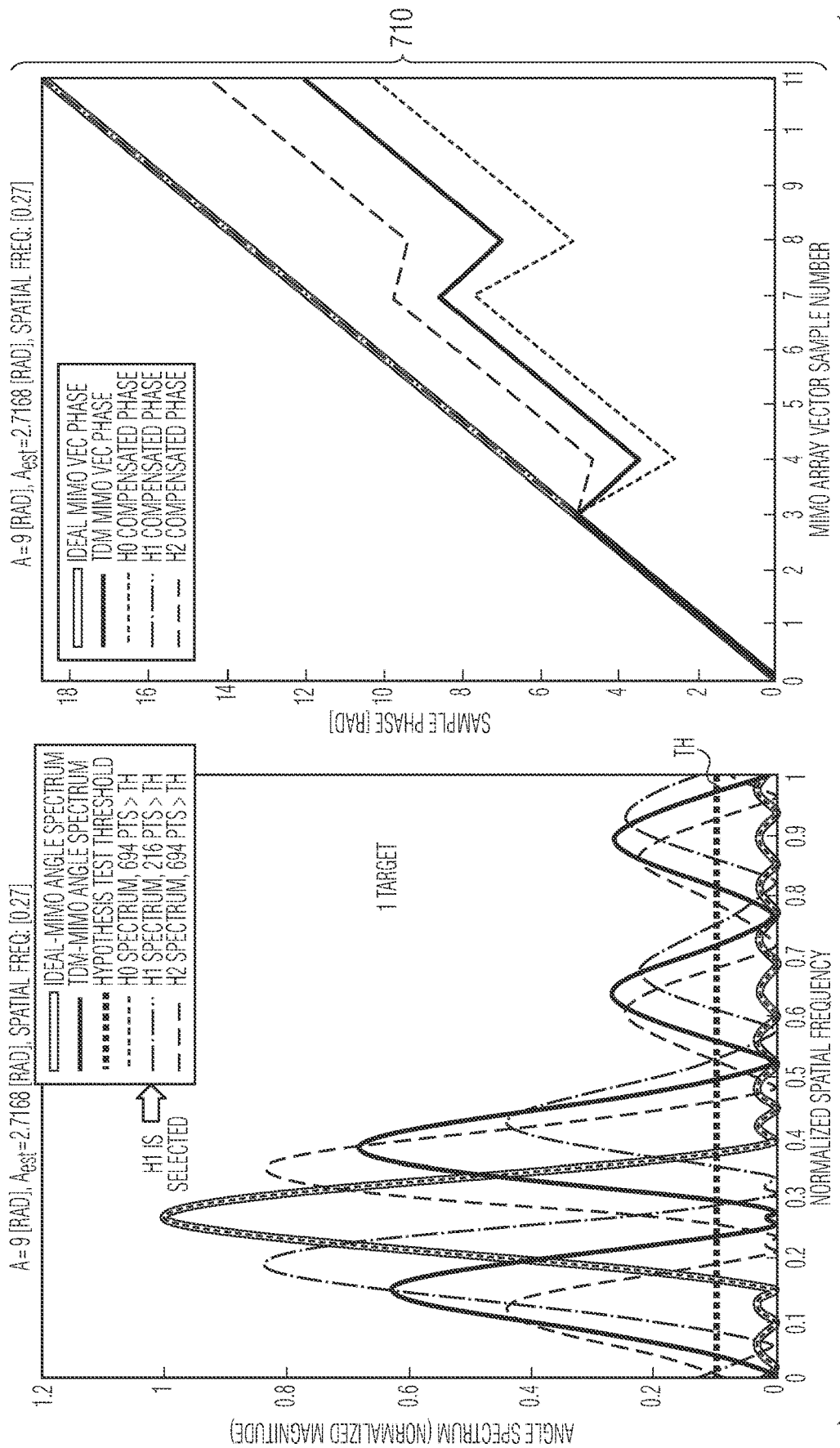
Figure 7B:
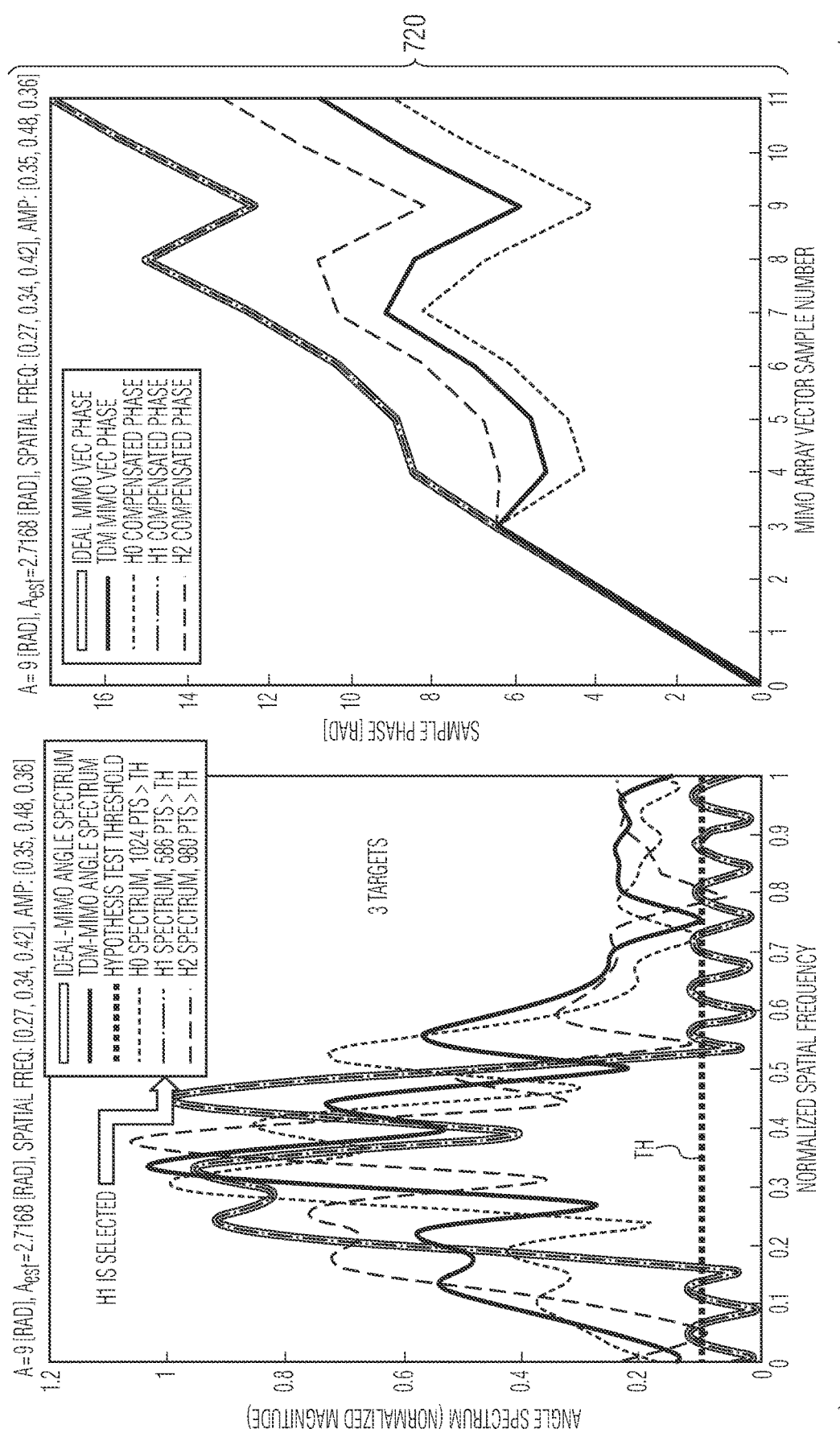
Figure 8A:
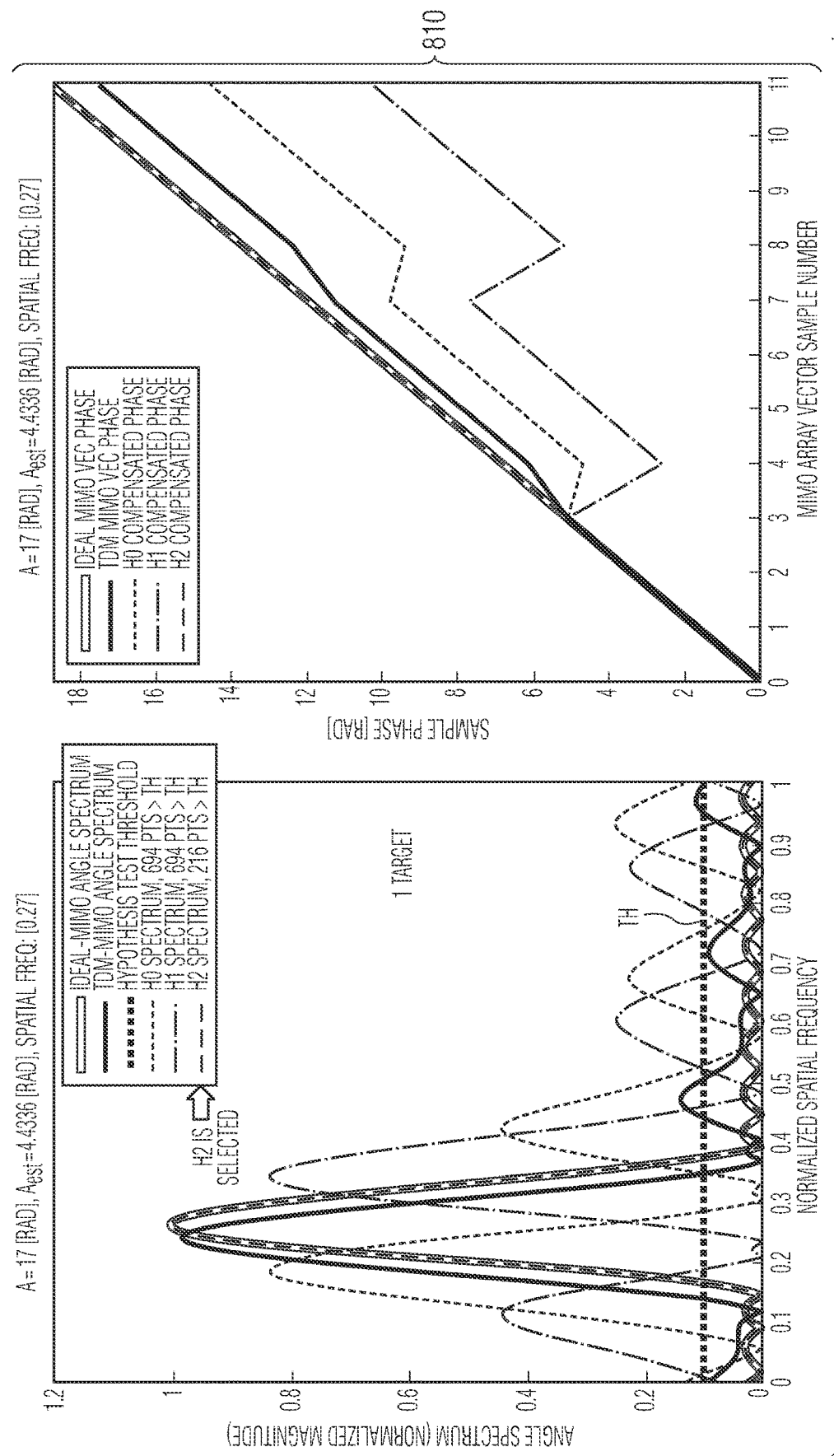
Figure 8B:
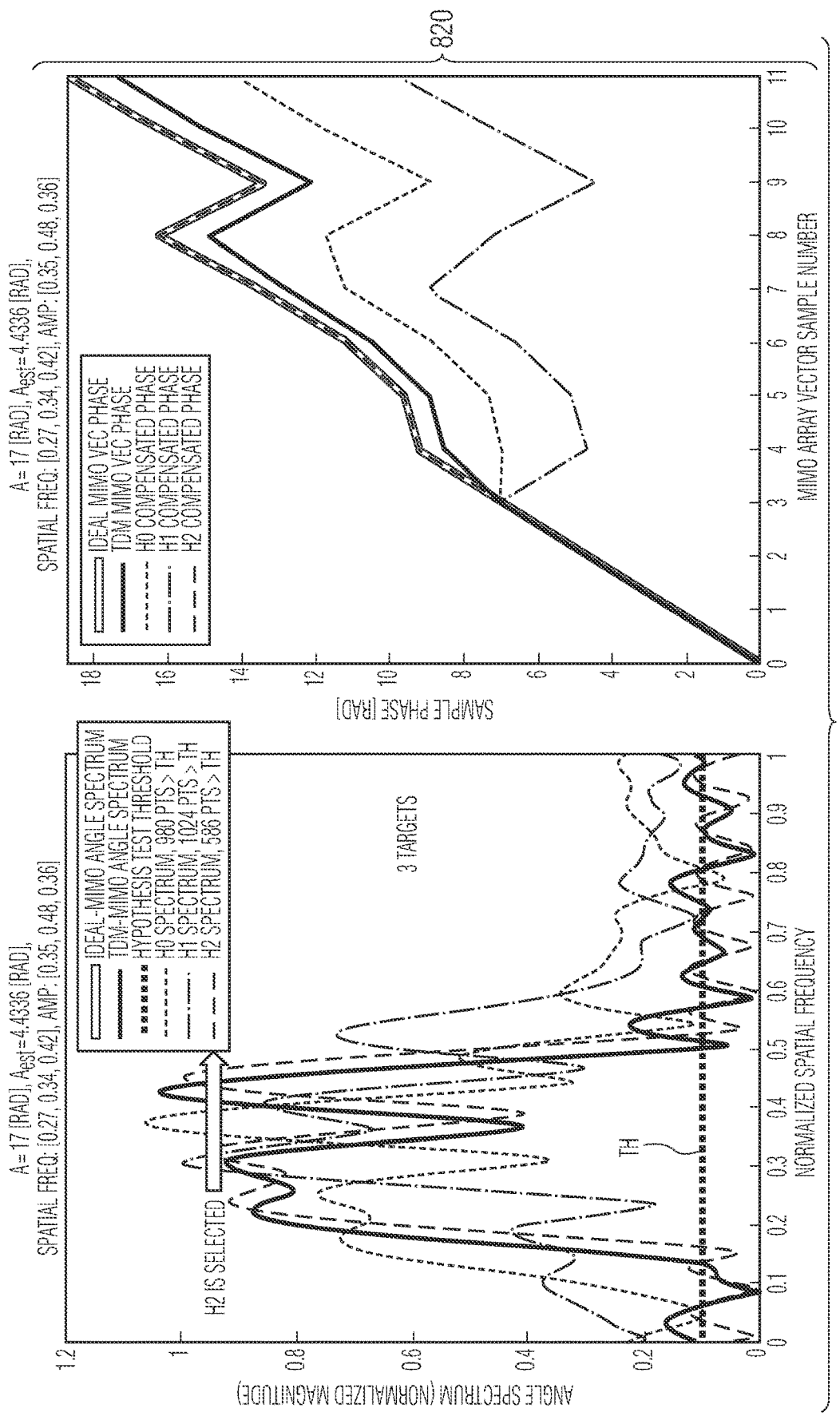

FIGS. 6A, 6B, 7A, 7B, 8A, and 8B are spectral diagrams illustrating examples of hypothesis tests for different levels of ambiguity in A (FIGS. 6A, 6B: 0π; FIGS. 7A, 7B: 2π; FIGS. 8A, 8B: 4π). Plots 610 (FIG. 6A), 710 (FIG. 7A), and 810 (FIG. 8A) illustrate results for each ambiguity level for one target. Plots 620 (FIG. 6B), 720 (FIG. 7B), and 820 (FIG. 8B) illustrate results for each ambiguity level for three targets. For each number of targets, the right-hand plot illustrates the phase of the MIMO vector of an ideal MIMO array, the TDM array with error, and the phase of the compensated TDM array using the three hypotheses. The left-hand plot illustrates resulting angle spectrums after applying the hypotheses and the ideal and uncompensated TDM spectrums. A selected threshold, TH, is illustrated by a horizontal dotted line. A correct hypothesis is identified as that with a fewest number of peaks above the threshold.

Embodiments function regardless of the number of targets present in the range-Doppler cell, as long as the targets share the same Doppler ambiguity. If the ambiguity level differs between the targets, then the algorithm can fail because of an assumption in solving for a common ambiguity. For scenarios in which there is a single target, a correct hypothesis typically leads to a spectrum with a strongest peak and a lowest sidelobe level. This is due to the coherent integration effect, that is, correct compensation leads to the highest possible coherent integration.

On the other hand, the peak level test does not apply to scenarios with multiple targets even when the Doppler ambiguity is the same. For example, the three-target H1 spectrum of 620 has the highest spectral peak, but that is not the correct hypothesis. The correct hypothesis, H0, does not result in the highest spectral peak but has the least spurious spectrum. Similarly, the three-target H2 spectrum of 720 has the highest spectral peak in that figure, but it is not the correct hypothesis (H1 is the correct, least spurious, hypothesis). Finally, the three-target H0 spectrum of 820 has the highest spectral peak, but that is not the correct hypothesis (H2 is the correct hypothesis). These examples show that using the highest-peak as a hypothesis selection criteria is not robust when there are multiple targets present in the range-Doppler cell under test. The proposed hypothesis selection criteria is more robust.

Figure 9A:
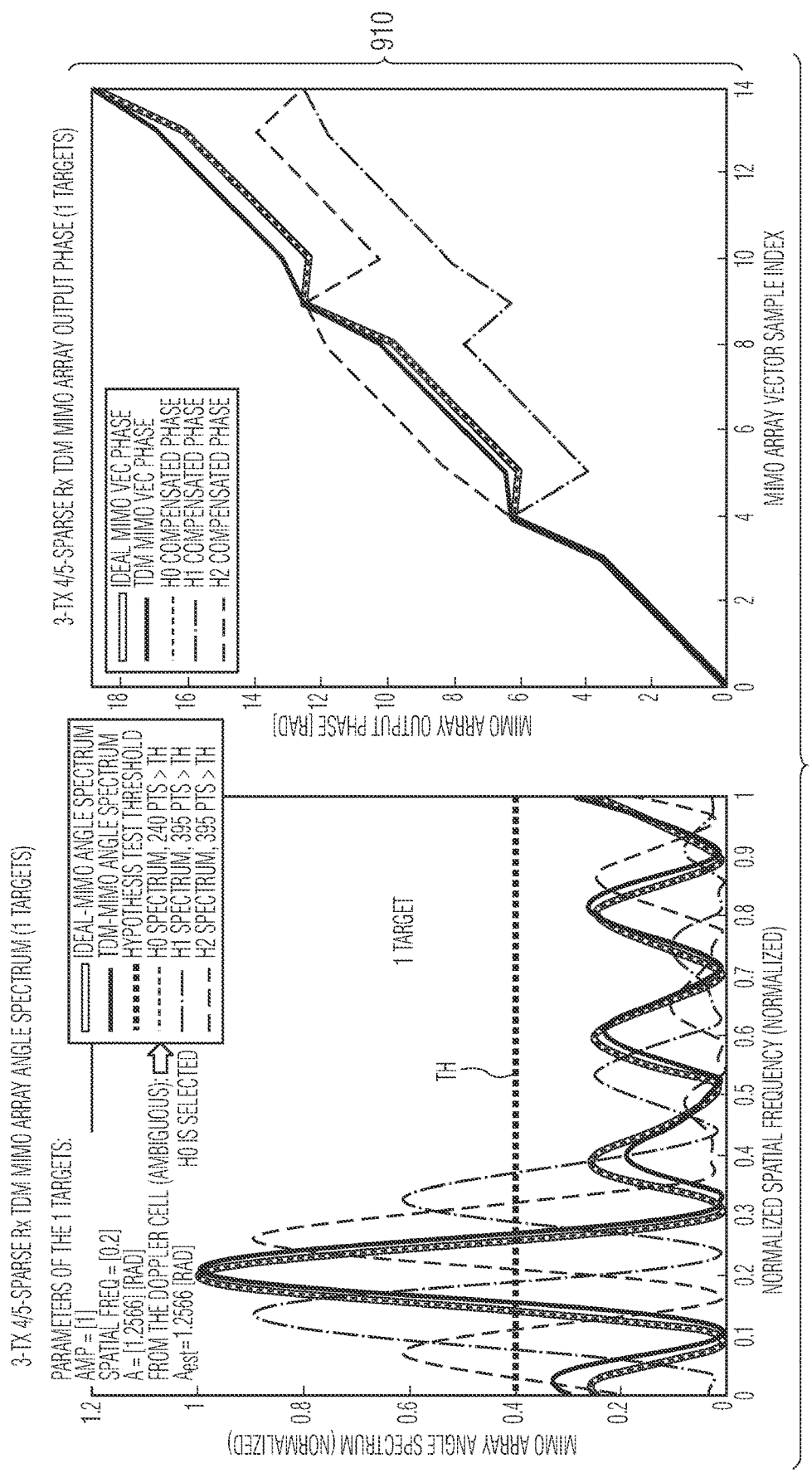
FIGS. 9A and 9B demonstrates an example of a hypothesis test for a sparse array at a selected ambiguity level.
Figure 9B:
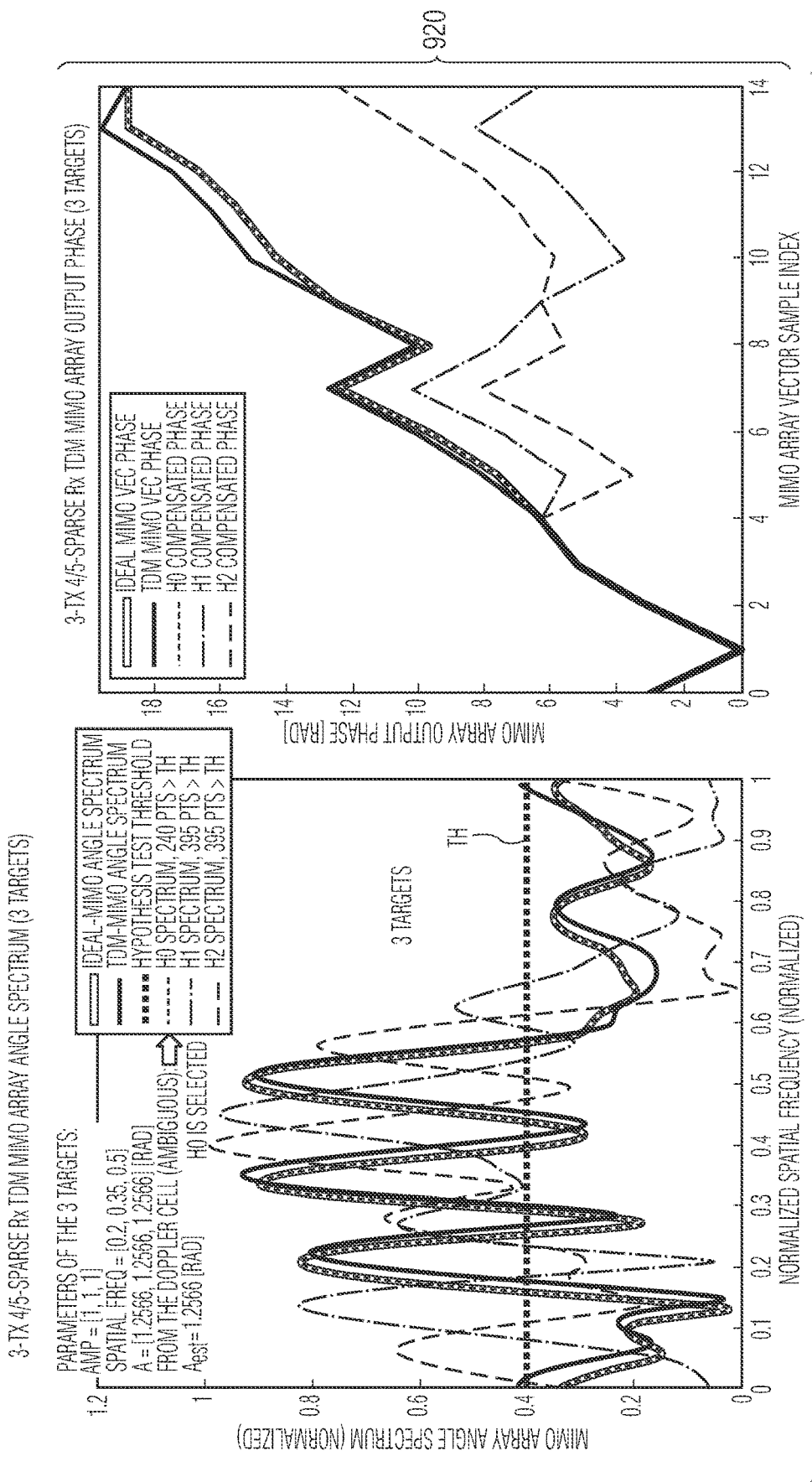

Similar to the examples in ULA above, a sparse array (e.g., a ULA with few holes) is also compatible with embodiments of the hypothesis tests but a higher threshold level is used. FIGS. 9A and 9B demonstrate an example of a hypothesis test for a sparse array (e.g., four elements plus one hole) at an ambiguity level of A=0π. A correct hypothesis H1, H2 and H3 is selected as desired. As with FIGS. 6-8, the plot 910 (FIG. 9A) is the result from a one-target scenario, and plot 920 (FIG. 9B) is a three-target scenario. The method functions for a single target case with a sparse array. But an additional confidence level test should be performed in multiple-target case to secure the high-test integrity. The confidence level test will be discussed in greater detail below in conjunction with a non-common ambiguity scenario, which similarly needs the confidence level test.

The proposed method can be extrapolated to TDM MIMO radar systems having two transmitters or more than three transmitters. For a TDM MIMO system of $N_{TX}$ transmitters, $N_{TX}$ hypotheses are established and tested using the least-spurious spectrum criteria discussed above for correct application of phase compensation.

In general, for an N-transmitter TDM MIMO radar systems (any k=0, 1, 2, . . . ):

If H0 is true (Â ambig: ±2π(Nk))→Phase Compensations to [TX1, TX2, TX3, . . . , TXN] measurements:

$$[A_1, A_2, A_3, \ldots, A_N] = \left[0, -\frac{\hat{A}}{N}, -\frac{2\hat{A}}{N}, \ldots, -\frac{(N-1)\hat{A}}{N}\right]$$

If H1 is true (Â ambig: ±2π(Nk+1))→Phase Compensations to [TX1, TX2, TX3, . . . , TXN] measurements:

$$[A_1, A_2, A_3, \ldots, A_N] = \left[0, -\left(\frac{\hat{A}}{N} + \frac{1*1*2\pi}{N}\right),\right.$$
$$\left. -\left(\frac{2\hat{A}}{N} + \frac{1*2*2\pi}{N}\right), \ldots, -\left(\frac{(N-1)\hat{A}}{N} + \frac{1*(N-1)*2\pi}{N}\right)\right]$$

If H2 is true (Â ambig: ±2π(Nk+2))→Phase Compensations to [TX1, TX2, TX3, . . . , TXN] measurements:

$$[A_1, A_2, A_3, \ldots, A_N] = \left[0, -\left(\frac{\hat{A}}{N} + \frac{2*1*2\pi}{N}\right),\right.$$
$$\left. -\left(\frac{2\hat{A}}{N} + \frac{2*2*2\pi}{N}\right), \ldots, -\left(\frac{(N-1)\hat{A}}{N} + \frac{2*(N-1)*2\pi}{N}\right)\right]$$

If H(m−1) is true ($\hat{A}$ ambig: $\pm 2\pi(Nk+m-1)$)→Phase Compensations to [TX1, TX2, TX3, . . . , TXN] measurements:

$$[A_1, A_2, A_3, \ldots, A_N] = \left[0, -\left(\frac{\hat{A}}{N} + \frac{(m-1)*1*2\pi}{N}\right), -\left(\frac{2\hat{A}}{N} + \frac{[(m-1)*2*2\pi]}{N}\right), \ldots, -\left(\frac{(N-1)\hat{A}}{N} + \frac{(m-1)*(N-1)*2\pi}{N}\right)\right]$$

If H(N−1) is true ($\hat{A}$ ambig: $\pm 2\pi(Nk+N-1)$)→Phase Compensations to [TX1, TX2, TX3, . . . , TXN] measurements:

$$[A_1, A_2, A_3, \ldots, A_N] = \left[0, -\left(\frac{\hat{A}}{N} + \frac{(N-1)*1*2\pi}{N}\right), -\left(\frac{2\hat{A}}{N} + \frac{(N-1)*2*2\pi}{N}\right), \ldots, -\left(\frac{(N-1)\hat{A}}{N} + \frac{(N-1)*(N-1)*2\pi}{N}\right)\right]$$

Based on the phase compensations measurements, a general form of the phase compensations can be formatted into the following N×N matrix, where N is the number of transmitters (TX) and the m-th row corresponds to the phase compensation measurements of hypothesis H(m−1), where m=1 . . . N.

$$\begin{bmatrix} A_{1,1} & A_{1,2} & A_{1,3} & \ldots & A_{1,N} \\ & & \vdots & & \\ A_{m,1} & A_{m,2} & A_{m,3} & \ldots & A_{m,N} \\ & & \vdots & & \\ A_{N,1} & A_{N,2} & A_{N,3} & \ldots & A_{N,N} \end{bmatrix} = \begin{bmatrix} 1 \\ \vdots \\ 1 \\ \vdots \\ 1_{N_{th}} \end{bmatrix} \left[0 - \frac{\hat{A}}{N} - \frac{2\hat{A}}{N} \ldots - \frac{(N-1)\hat{A}}{N}\right] - \frac{2\pi}{N} \begin{bmatrix} 0 & 0 & 0 & \ldots & 0 \\ & & \vdots & & \\ 0 & (m-1)*1 & (m-1)*2 & \ldots & (m-1)*(N-1) \\ & & \vdots & & \\ 0 & (N-1)*1 & (N-1)*2 & \ldots & (N-1)*(N-1) \end{bmatrix}$$

Each element of the above phase compensation matrix can also be directly determined using the following equation:

$$A_{m,i} = -\frac{i-1}{N}[\hat{A} + 2\pi(m-1)]$$

for $i, m \in \{1, 2, 3, \ldots N\}$ $A_{m,i}$ corresponds to all of the i-th TX terms under the hypothesis H(m−1). The phase compensation is then applied to the MIMO array antenna element using the following equation:

$$\check{x}_{i,j,m} = x_{i,j}e^{jA_{m,i}}$$

In this equation, $j \neq j$ and $j \equiv \sqrt{-1}$; $x_{i,j}$ is MIMO virtual array element output corresponding to $TX_i$ and $RX_j$. Further, $\check{x}_{i,j,m}$ is the compensated output under the hypothesis H(m−1). An angle spectrum corresponding to the hypothesis H(m−1) can be found as the Fourier Transform of the array spatial measurement vector consisting of elements of $[\check{x}_{i,j,m}]$.

As illustrated above, the more transmitters used for TDM, the higher the Doppler ambiguity that can be resolved But, when more transmitters are used in TDM, higher Doppler ambiguity also occurs due to increased PRI. This results in reduced maximum unambiguous Doppler signals. Even though the amount of Doppler ambiguity increases as more transmitters are used for TDM, the ambiguity remains resolvable using embodiments of the present invention. Thus, through the use of embodiments of the present invention, a larger number of TDM transmitters can be employed to form a larger MIMO array without concerns associated with degraded maximum Doppler or maximum radial velocity performance or angle estimation errors caused by incorrectly compensated phases of the MIMO array outputs. This is a significant advantage over certain prior art methods.

For scenarios in which multiple targets are present in a range-Doppler cell, if the ambiguity is not identical for all targets, the above approach may not work. This is due to the approach only attempting to detect a single common ambiguity value to be applied to all targets. The common ambiguity condition should be satisfied for the hypothesis tests to be performed and resolved with high confidence.

Though correct compensation cannot be produced reliably by the above approach when ambiguity differs among targets, the condition under which such event occurs can be detected by embodiments and then the result can be flagged as "low confidence," accordingly. If needed, artificial intelligence and machine learning techniques using deep neural networks have achieved significant results in approximating highly complex non-linear mappings. These techniques could be leveraged to estimate the thresholds dynamically as well as detecting multiple ambiguities between targets.

Figure 10A:
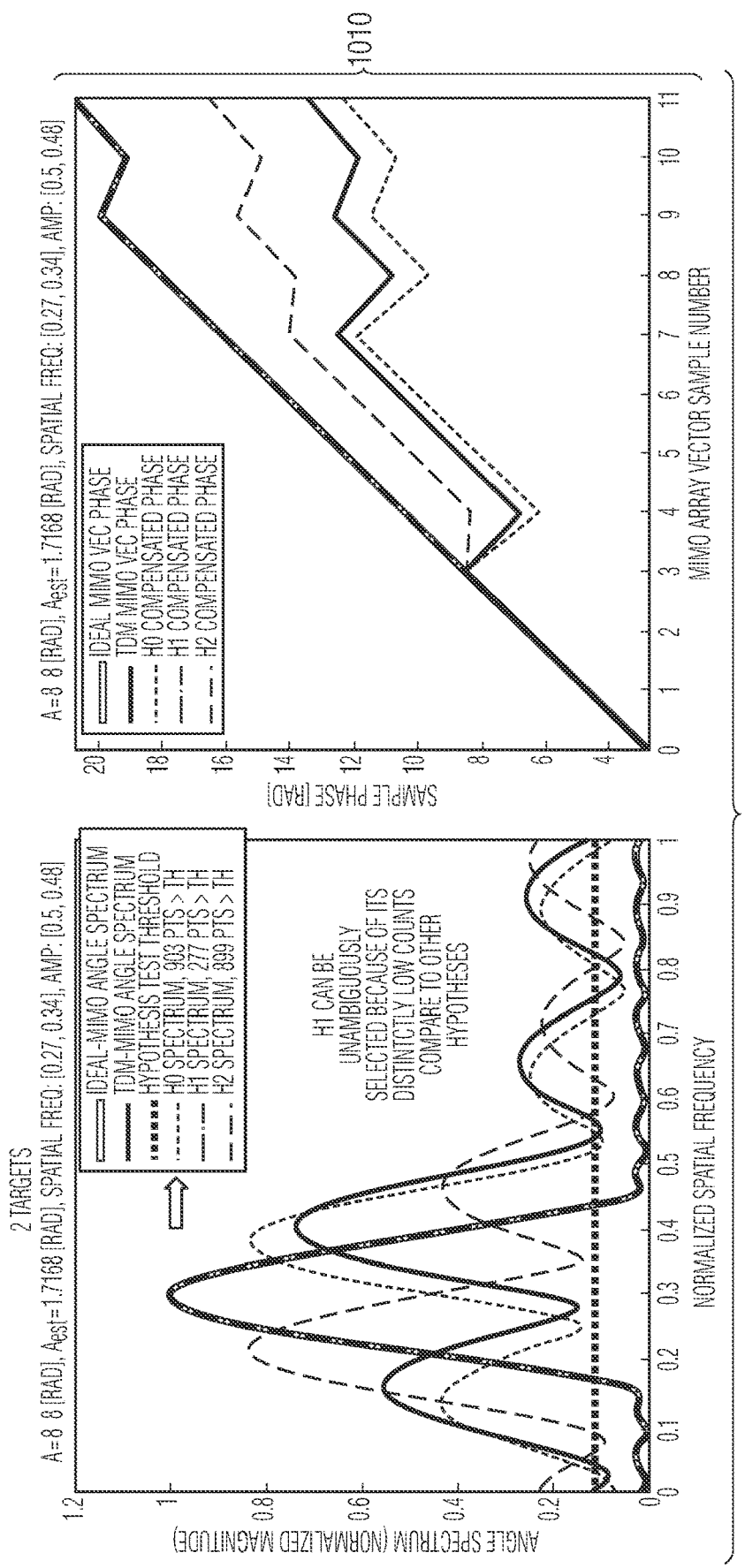
FIGS. 10A, 10B, and 10C depict an example of a two-target scenario illustrating differing ambiguity levels.
Figure 10B:
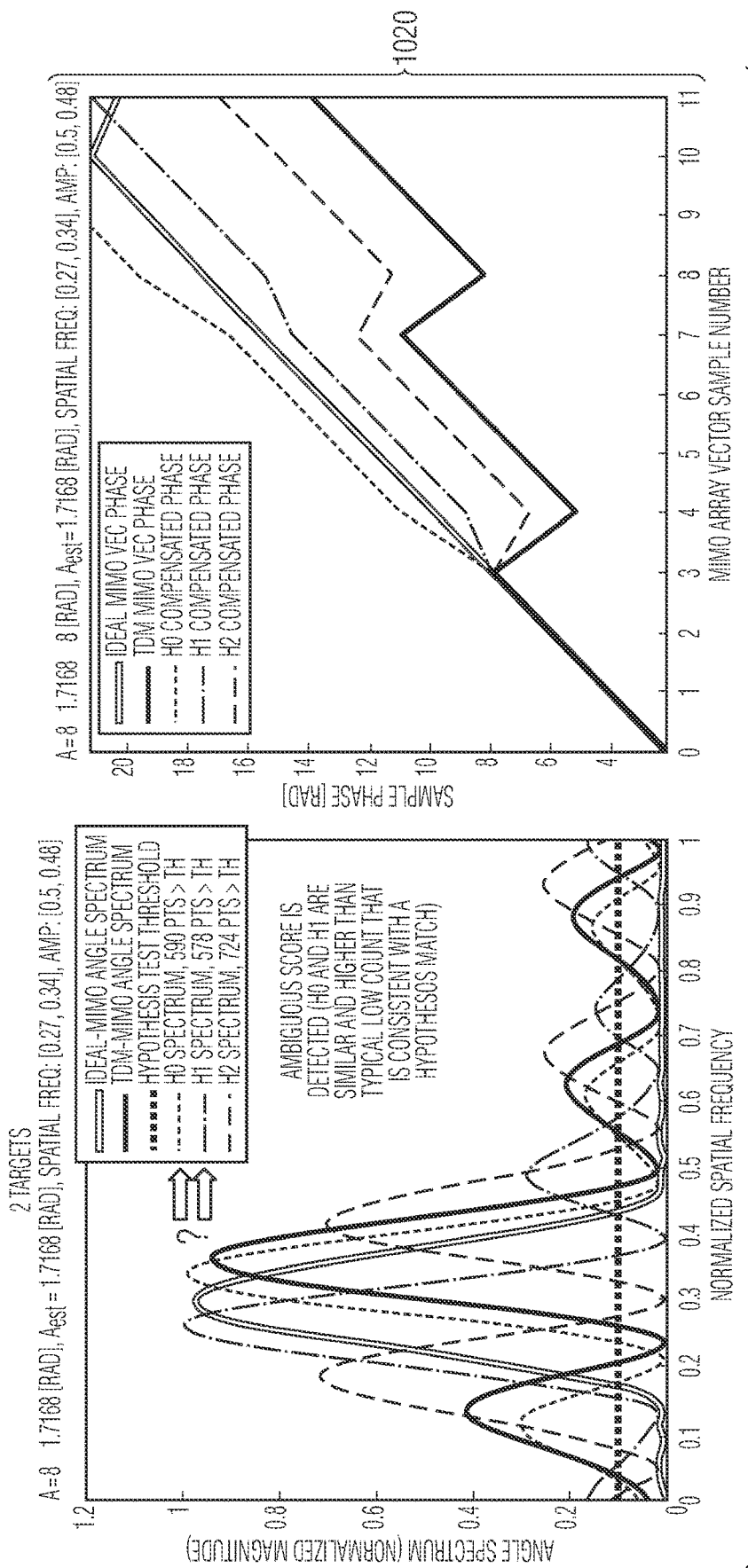
Figure 10C:
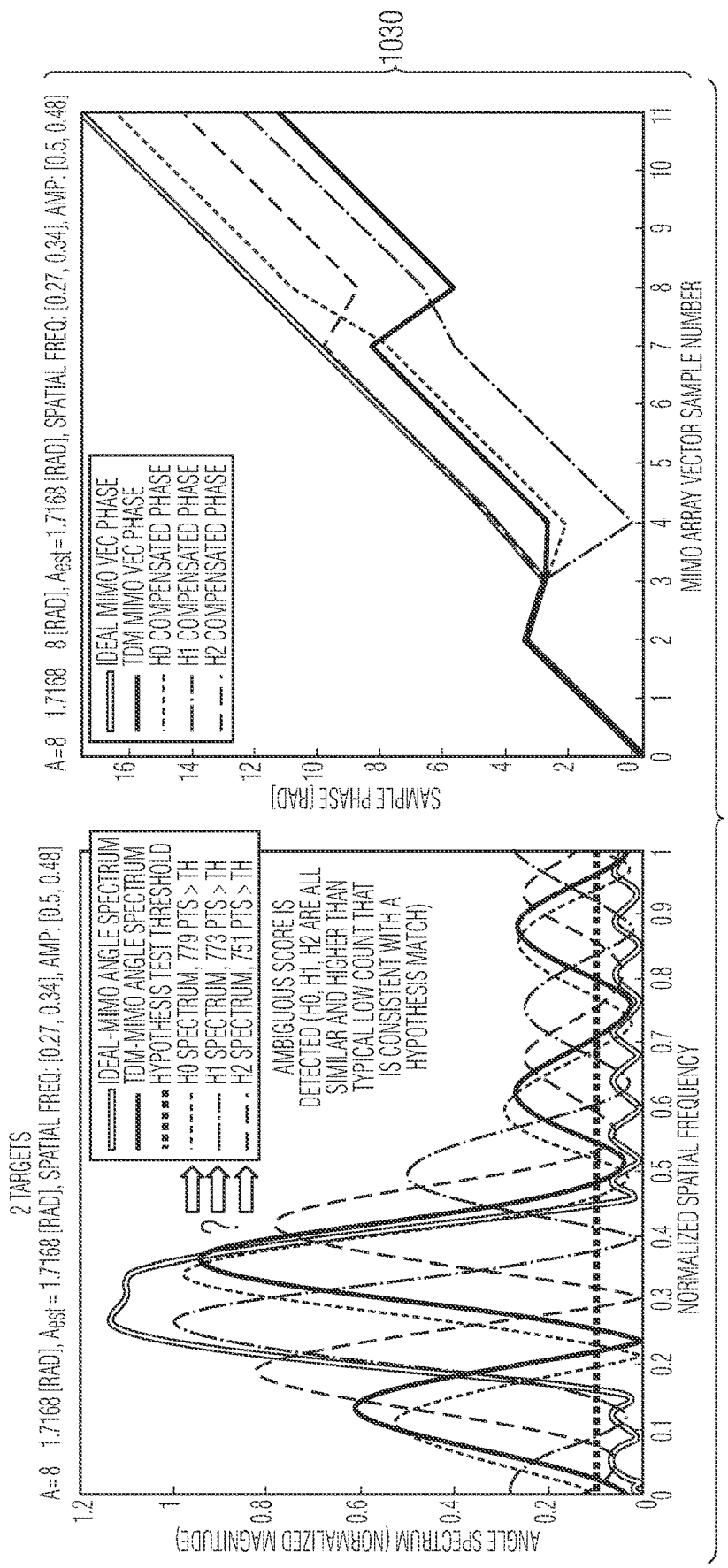

FIGS. 10A, 10B and 10C depict an example of a two-target case in which the plot 1010 is a scenario in which the A ambiguity are identical. Plots 1020 (FIG. 10B) and 1030 (FIG. 10C) scenarios in which the A ambiguity value differs between the targets. In the scenarios in which the ambiguity differs, a threshold crossing count no longer can reliably indicate a hypothesis with a lowest count value. In the plots 1020 and 1030, either two similar lower counts between the hypotheses are obtained or all three counts are similar, so a correct hypothesis cannot be identified with high confidence. Based on this observation, the following sanity check should be performed (see, e.g., FIG. 11 element 1150). The hypothesis selection should be flagged as LOW CONFIDENCE if any of the following conditions are met. Otherwise it should be flagged as HIGH CONFIDENCE.

The lowest count is above a predefined threshold, T1.

The absolute difference between the lowest count and the second lowest count is not greater than a predefined threshold, T2.

The ratio of the second lowest count and the lowest count is not lower than a predefined threshold, T3.

These checks are provided by way of example. Embodiments are not restricted to the above confidence checks and additional checks can be developed heuristically.

Once the correct hypothesis is identified, the phase compensation associated with that identified hypothesis is applied during Doppler disambiguation and phase compensation processing 180 to derive a compensated array vector 182 that is used for angle estimation processing 185 and target tracking 190.

Embodiments of the present invention provide a capability for resolving Doppler ambiguity within a single frame that is applicable to an arbitrary number of TDM transmitters used in a MIMO Radar. Embodiments are tolerant to a multiple target condition that does not lead to strongest peaks leading to the correct phase compensation. Further, in scenarios in which the Doppler ambiguity of multiple targets are different, embodiments can flag the results as low confidence, thereby reducing risks associated with such situations. In addition, embodiments have a tolerance to a non-uniform linear array, but a degraded performance may be expected. The ability to resolve Doppler ambiguity within a single frame and to correctly apply phase compensation to the TDM MIMO array of an arbitrary number of transmitters and with a multiple number of targets is superior to previously used methods.

By now it should be appreciated that there has been provided a method for phase compensation in a time-division multiplexing (TDM) multi-input, multi-output (MIMO) radar. The method includes estimating a phase change over a pulse repetition interval (PRI) of data from a range-Doppler cell measured by the TDM MIMO radar, determining a set of transmitter phase compensation hypotheses using the estimated phase change, identifying a correct hypothesis from the set of transmitter phase hypotheses, and applying a phase compensation associated with the identified hypothesis to a MIMO array element.

In one aspect of the above embodiment, estimating the phase change over the PRI includes using a measured radial velocity of a target in a Doppler detection cell to calculate a measured phase change. In another aspect of the above embodiment, determining the set of transmitter phase compensation hypotheses includes determining a phase change corresponding to a start of each chirp interval time in a PRI. In a further aspect, determining the set of transmitter phase compensation hypotheses further includes adjusting the phase changes corresponding to the start of each chirp interval time by modulo $2\pi$ to acquire an actual phase change measurement for each hypothesis.

In another aspect of the above embodiment, identifying the correct hypothesis of the set of hypotheses further includes applying each hypothesis to obtain an associated corrected angle response spectrum from the range-Doppler cell data, and associating the correct hypothesis with a corrected angle response spectrum that includes the fewest spectral points above a threshold. In a further aspect, determining the threshold includes setting the threshold above a peak noise level for the angle response spectrum, and setting the threshold below a lowest peak in the angle response spectrum.

In yet another aspect of the above embodiment, the method further includes determining a confidence level of the identified correct hypothesis. In a further aspect, determining the confidence level includes setting the confidence level as low confidence when one or more of the following criteria is satisfied: an absolute difference between a lowest count of peaks above the threshold in a first spectrum and a second lowest count of peaks above the threshold in a second spectrum is not greater than a predetermined difference, a ratio of the second lowest count and the lowest count is not lower than a second threshold, and the lowest count is above a third threshold.

In another embodiment, a TDM MIMO radar system is provided that includes a linear frequency modulation TD-MIMO radar device and a radar microcontroller and processing unit coupled to an output of the LFM TD-MIMO radar device. The LFM TD-MIMO radar device includes a first plurality of RF transmitter units and a second plurality of RF receiver units. The radar microcontroller and processing unit is configured to receive digital domain signals from the second plurality of receiver units, convert the digital domain signals to an uncompensated array vector including information associated with one or more detected range Doppler cells, estimate a phase change over a pulse repetition interval of data from a range-Doppler cell of the one or more detected range-Doppler cells, determine a set of transmitter phase compensation hypotheses using the estimated phase change, identify a correct hypothesis from the set of transmitter phase hypotheses, and apply a phase compensation associated with the identified hypothesis to a MIMO array element.

In one aspect of the above embodiment, the radar microcontroller and processing unit is configured to estimate the phase change over the PRI of data by being further configured to use a measured radial velocity of a target in a Doppler detection cell to calculate a measured phase change. In another aspect, the radar microcontroller and processing unit is configured to determine the set of transmitter phase compensation hypotheses by being further configured to determine a phase change corresponding to a start of each chirp interval time in a PRI. In a further aspect, the radar microcontroller and processing unit is configured to determine the set of transmitter phase compensation hypotheses by being further configured to adjust the phase changes corresponding to the start of each chirp interval time by modulo $2\pi$ to acquire an actual phase change measurement for each hypothesis.

In another aspect, the radar microcontroller and processing unit is configured to identify the correct hypothesis of the set of hypotheses by being further configured to apply each hypothesis to obtain an associated corrected angle response spectrum from the range-Doppler cell data, and associate the correct hypothesis with a corrected angle response spectrum that includes a fewest spectral points above a threshold. In a further aspect, the radar microcontroller and processing unit is configured to determine the threshold by being further configured to set the threshold above a peak noise level for the angle response spectrum, and set the threshold below a lowest peak in the angle response spectrum.

In another aspect of the above embodiment, the radar microcontroller and processing unit is further configured to determine a confidence level of the identified correct hypothesis. In a further aspect, the radar microcontroller and processing unit is configured to determine the confidence level by being further configured to set the confidence level as low confidence when one or more of the following criteria are satisfied: an absolute difference between a lowest count of peaks above the threshold in a first spectrum and a second lowest count of peaks above the threshold in a second spectrum is not greater than a predetermined difference, a ratio of the second lowest count and the lowest count is not lower than a second threshold, and the lowest count is above a third threshold.

Another embodiment provides a processor coupled to a radar device including a first plurality of RF transmitter units and a second plurality of RF receiver units. The processor is configured to execute a set of instructions configured for estimating a phase change over a pulse repetition interval of data from a range-Doppler cell measured by the radar device, determining a set of transmitter phase compensation hypotheses using the estimated phase change, identifying a correct hypothesis from the set of transmitter phase hypotheses, and applying a phase compensation associated with the identified hypothesis to a MIMO array element.

In one aspect of the above embodiment, the instructions configured for estimating the phase change over the PRI of data further include instructions configured for using a measured radial velocity of a target in a Doppler detection cell to calculate a measured phase change. In another aspect, the instructions configured for determining the set of transmitter phase compensation hypotheses further include instructions configured for determining a phase change corresponding to a start of each chirp interval time in a PRI. In yet another embodiment, the instructions configured for identifying the correct hypothesis of the set of hypotheses include instructions configured for applying each hypothesis to obtain and associated corrected angle response spectrum from the range-Doppler cell data, and associating the correct hypothesis with a corrected angle response spectrum that includes a fewest spectral points above a threshold.

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

The term "program," as used herein, is defined as a sequence of instructions designed for execution on a computer system. A program, or computer program, may include a subroutine, a function, a procedure, an object method, an object implementation, an executable application, an applet, a servlet, a source code, an object code, a shared library/dynamic load library and/or other sequence of instructions designed for execution on a computer system.

Some of the above embodiments, as applicable, may be implemented using a variety of different information processing systems. For example, although FIG. 1 and the discussion thereof describe an exemplary information processing architecture, this exemplary architecture is presented merely to provide a useful reference in discussing various aspects of the invention. Of course, the description of the architecture has been simplified for purposes of discussion, and it is just one of many different types of appropriate architectures that may be used in accordance with the invention. Those skilled in the art will recognize that the boundaries between logic blocks are merely illustrative and that alternative embodiments may merge logic blocks or circuit elements or impose an alternate decomposition of functionality upon various logic blocks or circuit elements.

Thus, it is to be understood that the architectures depicted herein are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Also for example, in one embodiment, the illustrated elements of radar system 100 are circuitry located on a single integrated circuit or within a same device. Alternatively, radar system 100 may include any number of separate integrated circuits or separate devices interconnected with each other. For example, radar device 110 and radar MCPU 150 may be located on separate integrated circuits or devices.

Furthermore, those skilled in the art will recognize that boundaries between the functionality of the above-described operations merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

All or some of the program elements described herein may be received elements of radar system 100, for example, from computer readable media. Such computer readable media may be permanently, removably or remotely coupled to an information processing system such as system 10. The computer readable media may include, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as FLASH memory, EEPROM, EPROM, ROM; ferromagnetic digital memories; MRAM; volatile storage media including registers, buffers or caches, main memory, RAM, etc.; and data transmission media including computer networks, point-to-point telecommunication equipment, and carrier wave transmission media, just to name a few.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

The term "coupled," as used herein, is not intended to be limited to a direct coupling or a mechanical coupling.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A method for phase compensation in a time-division multiplexing (TDM) multi-input, multi-output (MIMO) radar, the method comprising:
estimating a phase change over a pulse repetition interval (PRI) of data from a range-Doppler cell measured by the TDM MIMO radar;
determining a set of transmitter phase compensation hypotheses using the estimated phase change;
identifying a correct hypothesis from the set of transmitter phase hypotheses by,
applying each hypothesis from the set of transmitter phase compensation hypotheses to obtain an associated corrected angle response spectrum from the range-Doppler cell data; and associating the correct hypothesis with a corrected angle response spectrum that comprises a fewest spectral points above a threshold; and applying a phase compensation associated with the identified correct hypothesis to a MIMO array element.

2. The method of claim 1 wherein said estimating the phase change over the PRI comprises using a measured radial velocity of a target in a Doppler detection cell to calculate the estimated phase change.

3. The method of claim 1 wherein said determining the set of transmitter phase compensation hypotheses comprises determining a phase change corresponding to a start of each chirp interval time (CIT) in a PRI.

4. The method of claim 3 wherein said determining the set of transmitter phase compensation hypotheses further comprises adjusting the phase changes corresponding to the start of each chirp interval time by modulo $2\pi$ to acquire an actual phase change measurement for each hypothesis.

5. The method of claim 1 wherein determining the threshold comprises:
    setting the threshold above a peak noise level for the angle response spectrum; and
    setting the threshold below a lowest peak in the angle response spectrum.

6. The method of claim 1 further comprising determining a confidence level of the identified correct hypothesis.

7. The method of claim 6 wherein said determining the confidence level comprises:
    setting the confidence level as low confidence when one or more of the following criteria is satisfied:
        an absolute difference between a lowest count of peaks above the threshold in a first spectrum and a second lowest count of peaks above the threshold in a second spectrum is not greater than a predetermined difference,
        a ratio of the second lowest count and the lowest count is not lower than a second threshold, and
        the lowest count is above a third threshold.

8. A TDM MIMO radar system comprising:
    a linear frequency modulation (LFM) TD-MIMO radar device comprising a first plurality of radio-frequency (RF) transmitters units and a second plurality of RF receiver units; and
    a radar microcontroller and processing unit, coupled to an output of the LFM TD-MIMO radar device, and configured to
        receive digital domain signals from the second plurality of receiver units,
        convert the digital domain signals to an uncompensated array vector comprising information associated with one or more detected range-Doppler cells,
        estimate a phase change over a pulse repetition interval (PRI) of data from a range-Doppler cell of the one or more detected range-Doppler cells,
        determine a set of transmitter phase compensation hypotheses using the estimated phase change,
        identify a correct hypothesis from the set of transmitter phase hypotheses, and
        apply a phase compensation associated with the identified hypothesis to a MIMO array element, and
        determine a confidence level of the identified correct hypothesis by being further configured to:
            set the confidence level as low confidence when one or more of the following criteria is satisfied:
                an absolute difference between a lowest count of peaks above a threshold in a first spectrum and a second lowest count of peaks above the threshold in a second spectrum is not greater than a predetermined difference,
                a ratio of the second lowest count and the lowest count is not lower than a second threshold, and
                the lowest count is above a third threshold.

9. The TDM MIMO radar system of claim 8 wherein the radar microcontroller and processing unit is configured to estimate the phase change over the PRI of data by being further configured to use a measured radial velocity of a target in a Doppler detection cell to calculate the estimated phase change.

10. The TDM MIMO radar system of claim 8 wherein the radar microcontroller and processing unit is configured to determine the set of transmitter phase compensation hypotheses by being further configured to determine a phase change corresponding to a start of each chirp interval time (CIT) in a PRI.

11. The TDM MIMO radar system of claim 10 wherein the radar microcontroller and processing unit is configured to determine the set of transmitter phase compensation hypotheses by being further configured to adjust the phase changes corresponding to the start of each chirp interval time by modulo $2\pi$ to acquire an actual phase change measurement for each hypothesis.

12. The TDM MIMO radar system of claim 8 wherein the radar microcontroller and processing unit is configured to identify the correct hypothesis of the set of hypotheses by being further configured to:
    apply each hypothesis to obtain an associated corrected angle response spectrum from the range-Doppler cell data; and
    associate the correct hypothesis with a corrected angle response spectrum that comprises a fewest spectral points above the threshold.

13. The TDM MIMO radar system of claim 12 wherein the radar microcontroller and processing unit is configured to determine the threshold by being further configured to:
    set the threshold above a peak noise level for the angle response spectrum; and
    set the threshold below a lowest peak in the angle response spectrum.

14. A processor, coupled to a radar device comprising a first plurality of radio-frequency (RF) transmitter units and a second plurality of RF receiver units, and configured to execute a set of instructions configured for:
    estimating a phase change over a pulse repetition interval (PRI) of data from a range-Doppler cell measured by the radar device;
    determining a set of transmitter phase compensation hypotheses using the estimated phase change;
    identifying a correct hypothesis from the set of transmitter phase hypotheses by:
        applying each hypothesis from the set of transmitter phase compensation hypotheses to obtain an associated corrected angle response spectrum from the range-Doppler cell data; and
        associating the correct hypothesis with a corrected angle response spectrum that comprises a fewest spectral points above a threshold; and
    applying a phase compensation associated with the identified correct hypothesis to a MIMO array element.

15. The processor of claim 14 wherein the instructions configured for estimating the phase change over the PRI of data further comprise instructions configured for using a measured radial velocity of a target in a Doppler detection cell to calculate the estimated phase change.

16. The processor of claim 14 wherein the instructions configured for determining the set of transmitter phase compensation hypotheses further comprise instructions configured for determining a phase change corresponding to a start of each chirp interval time (CIT) in a PRI.

* * * * *